US012564788B2

(12) United States Patent
Sato et al.

(10) Patent No.: US 12,564,788 B2
(45) Date of Patent: Mar. 3, 2026

(54) STORAGE MEDIUM, INFORMATION PROCESSING SYSTEM, INFORMATION PROCESSING APPARATUS, AND INFORMATION PROCESSING METHOD

(71) Applicant: NINTENDO CO., LTD., Kyoto (JP)

(72) Inventors: Yuya Sato, Kyoto (JP); Takashi Kuboki, Tokyo (JP)

(73) Assignee: NINTENDO CO., LTD., Kyoto (JP)

(*) Notice: Subject to any disclaimer, the term of this patent is extended or adjusted under 35 U.S.C. 154(b) by 239 days.

(21) Appl. No.: 18/240,813

(22) Filed: Aug. 31, 2023

(65) Prior Publication Data

US 2024/0082721 A1      Mar. 14, 2024

(30) Foreign Application Priority Data

Sep. 12, 2022      (JP) ................................. 2022-144907

(51) Int. Cl.
| | |
|---|---|
| *A63F 13/56* | (2014.01) |
| *A63F 13/42* | (2014.01) |
| *A63F 13/5258* | (2014.01) |
| *A63F 13/537* | (2014.01) |
| *A63F 13/837* | (2014.01) |

(52) U.S. Cl.
CPC .............. *A63F 13/56* (2014.09); *A63F 13/42* (2014.09); *A63F 13/5258* (2014.09); *A63F 13/537* (2014.09); *A63F 13/837* (2014.09)

(58) Field of Classification Search
CPC ............ A63F 2300/30; A63F 2300/303; A63F 2300/57; A63F 2300/60; A63F 2300/6623; A63F 13/40; A63F 13/42; A63F 13/44; A63F 13/45; A63F 13/50; A63F 13/52; A63F 13/55; A63F 13/56; A63F 13/58; A63F 13/5258; A63F 13/537; A63F 13/5372; A63F 13/5378; A63F 13/837

See application file for complete search history.

(56) References Cited

U.S. PATENT DOCUMENTS

| | | | | |
|---|---|---|---|---|
| 2020/0086216 A1* | 3/2020 | Shimomoto | ............ | A63F 13/58 |
| 2020/0197811 A1* | 6/2020 | Eatedali | ................... | G06N 3/02 |
| 2022/0233959 A1* | 7/2022 | Tsuda | ..................... | A63F 13/56 |
| 2023/0381665 A1* | 11/2023 | Dolan | ................... | A63F 13/795 |
| 2024/0335754 A1* | 10/2024 | Qian | ..................... | A63F 13/422 |

FOREIGN PATENT DOCUMENTS

| | | |
|---|---|---|
| JP | 2010-136744 | 6/2010 |
| JP | 2019103597 A | 6/2019 |
| JP | 2019-195418 | 11/2019 |
| JP | 2020-043884 | 3/2020 |

* cited by examiner

*Primary Examiner* — Omkar A Deodhar
(74) *Attorney, Agent, or Firm* — Nixon & Vanderhye PC

(57) ABSTRACT

An example of an information processing system moves a player character in accordance with an operation of a player, automatically moves a first non-player character, and when the player character is on a movable object and the movable object is moving, places the first non-player character on the movable object and causes the first non-player character to transition to an implementable state. If the first non-player character is in the implementable state, The example of the information processing system causes the first non-player character to perform a first action in accordance with an operation input provided by the player.

22 Claims, 17 Drawing Sheets

FIG. 21

| GAME PROGRAM |
|---|
| OPERATION DATA |
| PLAYER CHARACTER DATA |
| FIRST NPC DATA |
| SECOND NPC DATA |
| ENEMY CHARACTER DATA |
| MOVABLE OBJECT DATA |
| OBSTACLE OBJECT DATA |

FIG. 24

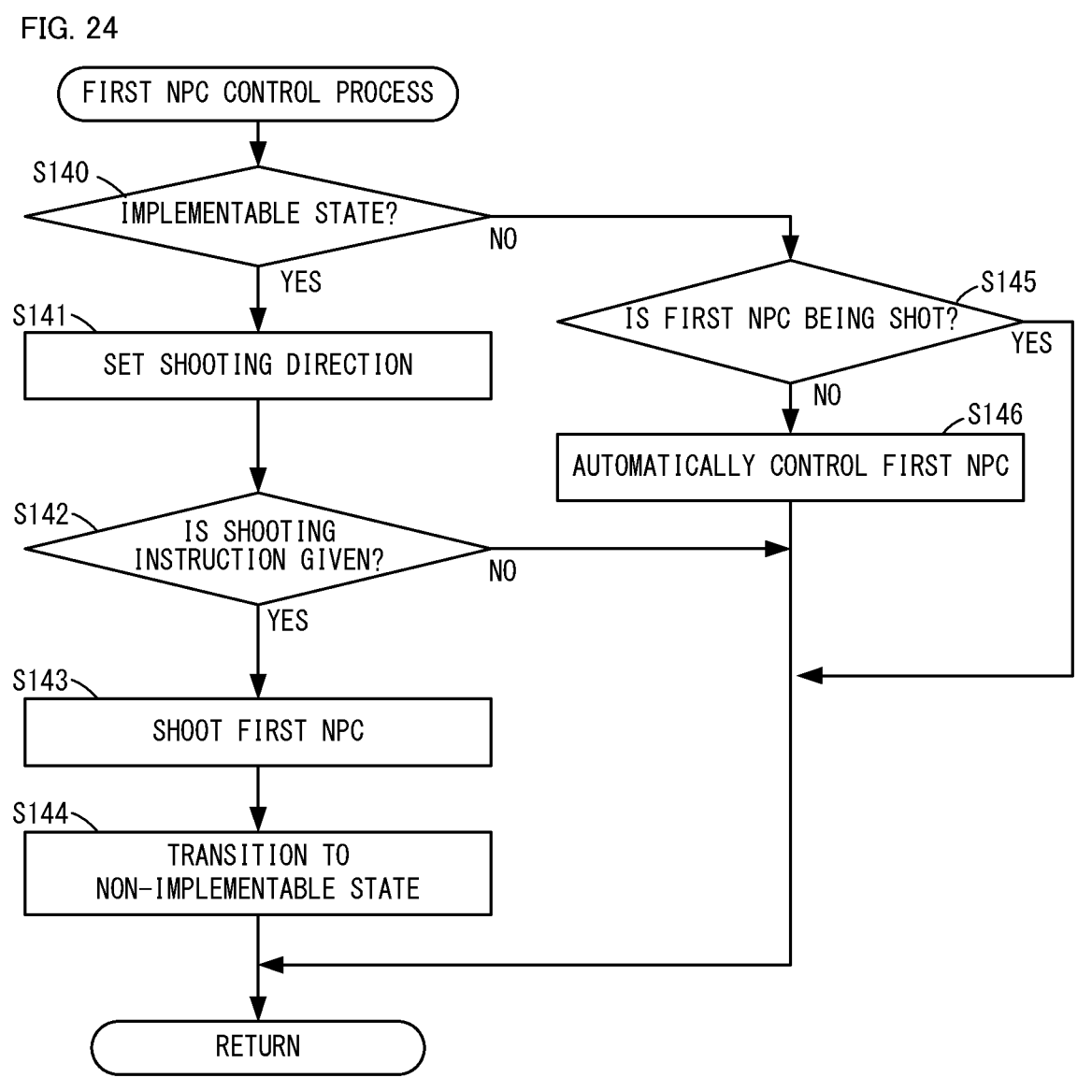

```
            ┌────────────────────────────────┐
            │  FIRST NPC CONTROL PROCESS     │
            └────────────────────────────────┘
                           │
                           ▼
S140 ╱──────────────────────────────────────╲
     ╲         IMPLEMENTABLE STATE?          ╱──── NO ────┐
       ╲──────────────────────────────────╱              │
                     │  YES                               ▼
                     ▼                          S145 ╱──────────────────────╲
S141 ┌────────────────────────────┐                 ╲  IS FIRST NPC BEING SHOT? ╱── YES ─┐
     │    SET SHOOTING DIRECTION   │                   ╲────────────────────────╱        │
     └────────────────────────────┘                         │  NO                        │
                     │                                       ▼                            │
                     │                          S146 ┌──────────────────────────────┐    │
                     │                               │ AUTOMATICALLY CONTROL FIRST NPC│   │
                     ▼                               └──────────────────────────────┘    │
S142 ╱──────────────────────╲                              │                             │
     ╲      IS SHOOTING       ╱                             │                             │
     ╲  INSTRUCTION GIVEN?    ╱──── NO ─────────────────────┘                             │
       ╲──────────────────╱                                                              │
                 │  YES                                                                   │
                 ▼                                                                        │
S143 ┌────────────────────────────┐                                                      │
     │       SHOOT FIRST NPC       │ ◄────────────────────────────────────────────────────┘
     └────────────────────────────┘
                 │
                 ▼
S144 ┌────────────────────────────┐
     │      TRANSITION TO          │
     │  NON-IMPLEMENTABLE STATE    │
     └────────────────────────────┘
                 │
                 ▼
            ┌──────────────┐
            │    RETURN     │
            └──────────────┘
```

STORAGE MEDIUM, INFORMATION PROCESSING SYSTEM, INFORMATION PROCESSING APPARATUS, AND INFORMATION PROCESSING METHOD

CROSS REFERENCE TO RELATED APPLICATION

This application claims priority to Japanese Patent Application No. 2022-144907 filed on Sep. 12, 2022, the entire contents of which are incorporated herein by reference.

FIELD

An exemplary embodiment relates to a non-transitory computer-readable storage medium having stored therein a game program, an information processing system, an information processing apparatus, and an information processing method that are capable of performing a game using a player character and a non-player character.

BACKGROUND AND SUMMARY

Conventionally, there is a game where a player character and a non-player character cooperate to battle. Specifically, in the conventional game, a player character and a plurality of non-player characters are present, and in the state where the player character and a non-player character are paired together, the paired characters caused to make a support attack in accordance with an instruction given by a player.

However, there is room for improvement in implementing an effect related to a non-player character when a player character is moving on an object.

Therefore, it is an object of an exemplary embodiment to provide a non-transitory computer-readable storage medium having stored therein a game program, an information processing system, an information processing apparatus, and an information processing method that are capable of making it easy to implement an effect related to a non-player character when a player character is moving on an object.

To achieve the above object, the exemplary embodiment employs the following configurations.

(First Configuration)

Instructions according to a first configuration, when executed, cause a processor of an information processing apparatus to execute game processing including moving a player character in a virtual space based on a first operation input and automatically moving a first non-player character in the virtual space. The game processing also includes, if the player character is on an object and the object is moving, placing the first non-player character on the object and causing the first non-player character to transition to an implementable state where the first non-player character can implement a first action, and if the first non-player character is in the implementable state, causing the first non-player character to perform the first action in accordance with a second operation input.

Based on the above, even in a case where a player character is on an object that is moving, it is possible to make it easy to cause a non-player character that is automatically controlled to perform an action.

(Second Configuration)

According to a second configuration, in the above first configuration, the game processing may further include, in a case where the first non-player character is not in the implementable state, and if the player character and the first non-player character have a predetermined positional relationship, causing the first non-player character to transition to the implementable state in accordance with provision of a third operation input.

Based on the above, in a case where a first non-player character is not in an implementable state, and if the player character and the first non-player character have a predetermined positional relationship, it is possible to cause the first non-player character to transition to the implementable state in accordance with a third operation input. In a case where the player character is on an object that is moving, the first non-player character is automatically placed on the object and enters the implementable state. Thus, it is possible to make it easy to cause the first non-player character to perform a first action.

(Third Configuration)

According to a third configuration, in the above first or second configuration, the game processing may further include shooting the first non-player character in a predetermined direction as the first action.

Based on the above, it is possible to shoot the first non-player character in a predetermined direction. Thus, it is possible to perform a game using the first non-player character.

(Fourth Configuration)

According to a fourth configuration, in the above third configuration, the game processing may further include setting the predetermined direction at least based on a direction of a line of sight of a virtual camera at a timing when the second operation input is provided.

Based on the above, it is possible to set the shooting direction of the first non-player character based on the direction of the line of sight of a virtual camera.

(Fifth Configuration)

According to a fifth configuration, in the above third or fourth configuration, the game processing may further include setting the predetermined direction at least based on a direction of the object at a timing when the second operation input is provided.

Based on the above, it is possible to set the shooting direction of the first non-player character based on the direction of an object.

(Sixth Configuration)

According to a sixth configuration, in any of the above third to fifth configurations, the game processing may further include, after the first non-player character is shot, and if the player character is on the object and the object is moving, moving the first non-player character onto the object, placing the first non-player character again, and causing the first non-player character to transition to the implementable state.

Based on the above, it is possible to shoot the first non-player character, then move the first non-player character onto an object, place the first non-player character on the object again, and bring the first non-player character into the implementable state. Consequently, it is possible to shoot the first non-player character and then immediately shoot the first non-player character again.

(Seventh Configuration)

According to a seventh configuration, in the above sixth configuration, the game processing may further include, if the first non-player character is shot, causing the first non-player character to transition from the implementable state to a non-implementable state where the first non-player character cannot implement the first action, and maintaining the first non-player character in the non-implementable state until a predetermined time elapses.

Based on the above, in a case where the first non-player character is shot, the first non-player character enters a non-implementable state, but if the player character is moving on an object, the first non-player character enters the implementable state, and it is possible to shoot the first non-player character. Thus, it is possible to prevent an opportunity to shoot from being lost due to a movement.

(Eighth Configuration)

According to an eighth configuration, any of in the above third to seventh configurations, the game processing may further include, if the shot first non-player character hits an enemy character in the virtual space, causing damage on the enemy character, or if the shot first non-player character hits a predetermined obstacle object in the virtual space, destroying or removing the obstacle object.

Based on the above, it is possible to cause the first non-player character to hit an enemy character and cause damage on the enemy character, or cause the first non-player character to hit an obstacle object and destroy the obstacle object. Thus, it is possible to perform a game positively using the first non-player character.

(Ninth Configuration)

According to a ninth configuration, in any of the above second to eighth configurations, the game processing may further include: automatically moving a second non-player character in the virtual space; and if the player character and the second non-player character have a predetermined positional relationship, producing a second effect in accordance with the second operation input.

Based on the above, the player character is brought into a predetermined positional relationship with a second non-player character, and a second operation input is provided, whereby it is possible to produce a second effect. In a game where a plurality of non-player characters are placed, and an effect relating to each non-player character is produced, and even when the player character is moving on an object, it is possible to make it easy to cause the first non-player character to perform the first action.

Another exemplary embodiment may be an information processing system that executes the above game processing, or may be an information processing apparatus, or may be an information processing method executed by an information processing system.

According to the exemplary embodiment, even if a player character is on an object that is moving, it is possible to make it easy to cause a non-player character that is automatically controlled to perform an action.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 21 is an example non-limiting diagram showing an example of data stored in a memory of the main body apparatus 2 during the execution of game processing;

FIG. 24 is an example non-limiting flow chart showing an example of a first NPC control process in step S105.

DETAILED DESCRIPTION OF NON-LIMITING EXAMPLE EMBODIMENTS (System Configuration)

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. Hereinafter, first, the hardware configuration of the game system 1 according to the exemplary embodiment is described, and then, the control of the game system 1 according to the exemplary embodiment is described.

Figure 1:
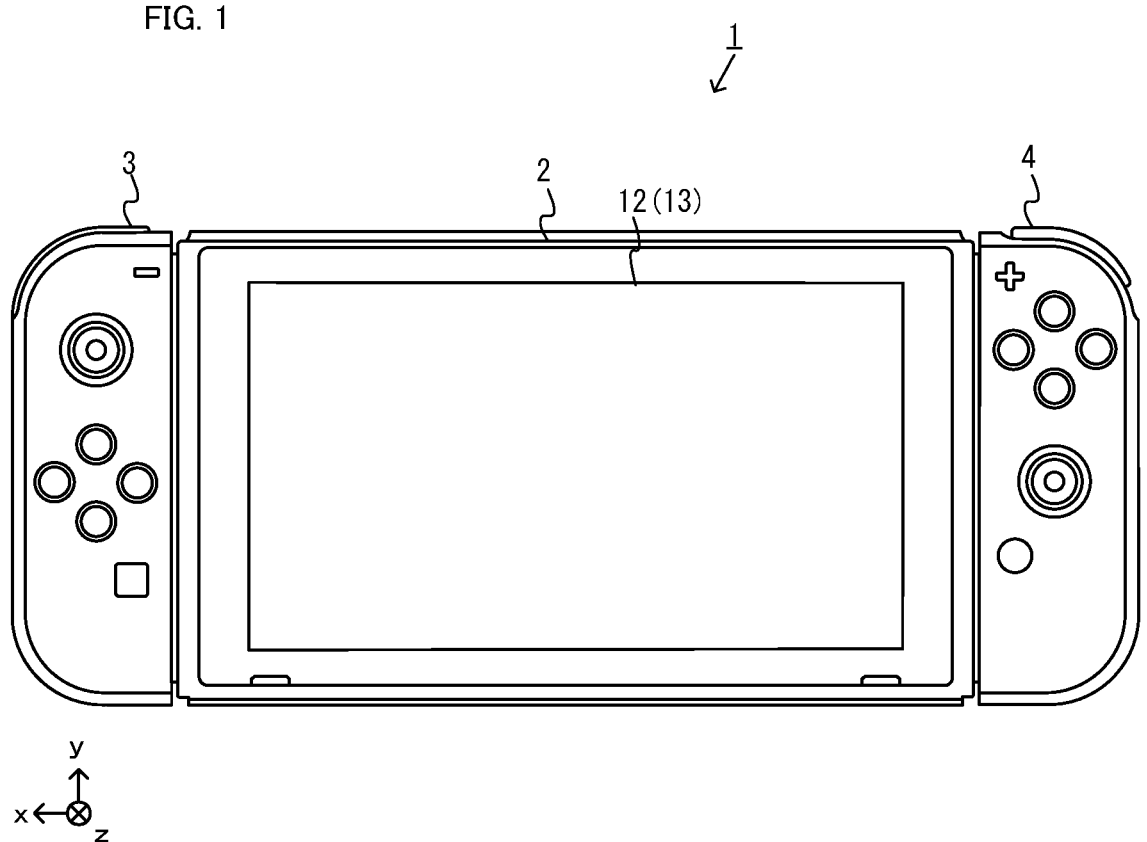
FIG. 1 is an example non-limiting diagram showing an exemplary state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

The left controller 3 and the right controller 4 are attachable to and detachable from the main body apparatus 2. It should be noted that hereinafter, the left controller 3 and the right controller 4 will occasionally be referred to collectively as a "controller".

The main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus. The main body apparatus 2 or the unified apparatus may function as a portable apparatus.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

Figure 2:
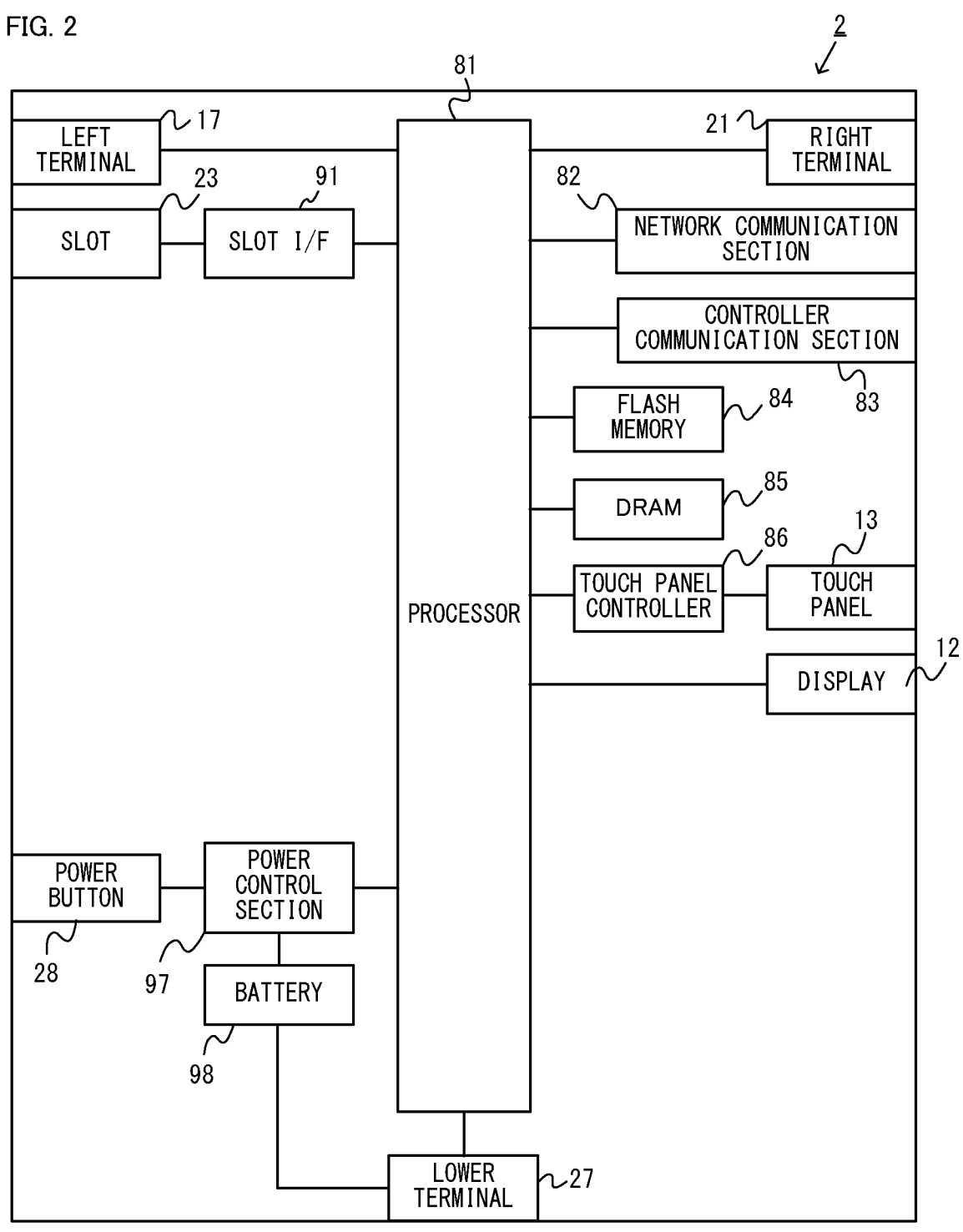
FIG. 2 is an example non-limiting block diagram showing an exemplary internal configuration of the main body apparatus 2.

FIG. 2 is a block diagram showing an example of the internal configuration of the main body apparatus 2.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of an SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication).

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 3:
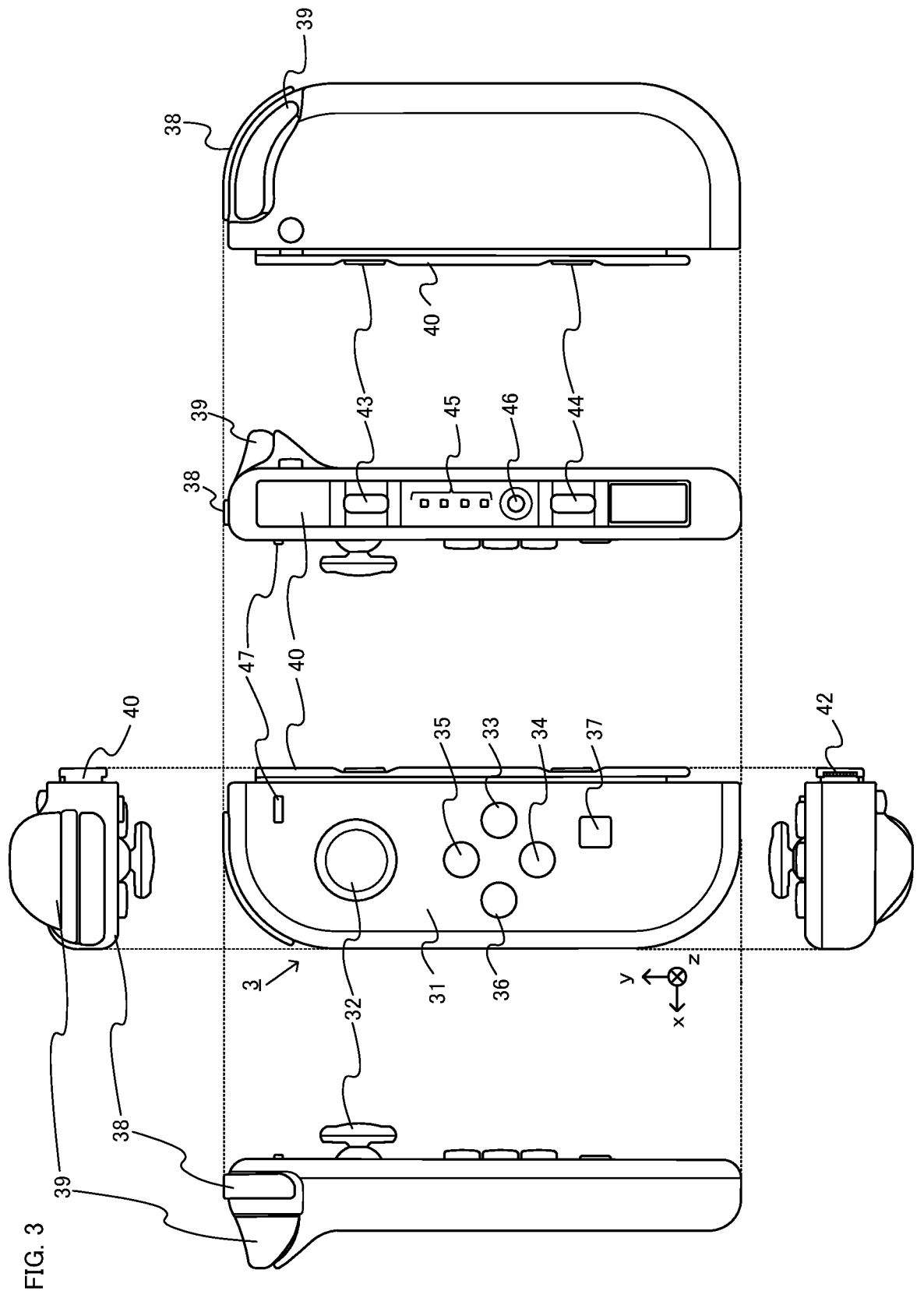
FIG. 3 is an example non-limiting six-sided view showing the left controller 3.

FIG. 3 is six orthogonal views showing an example of the left controller 3. In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 3, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 4:
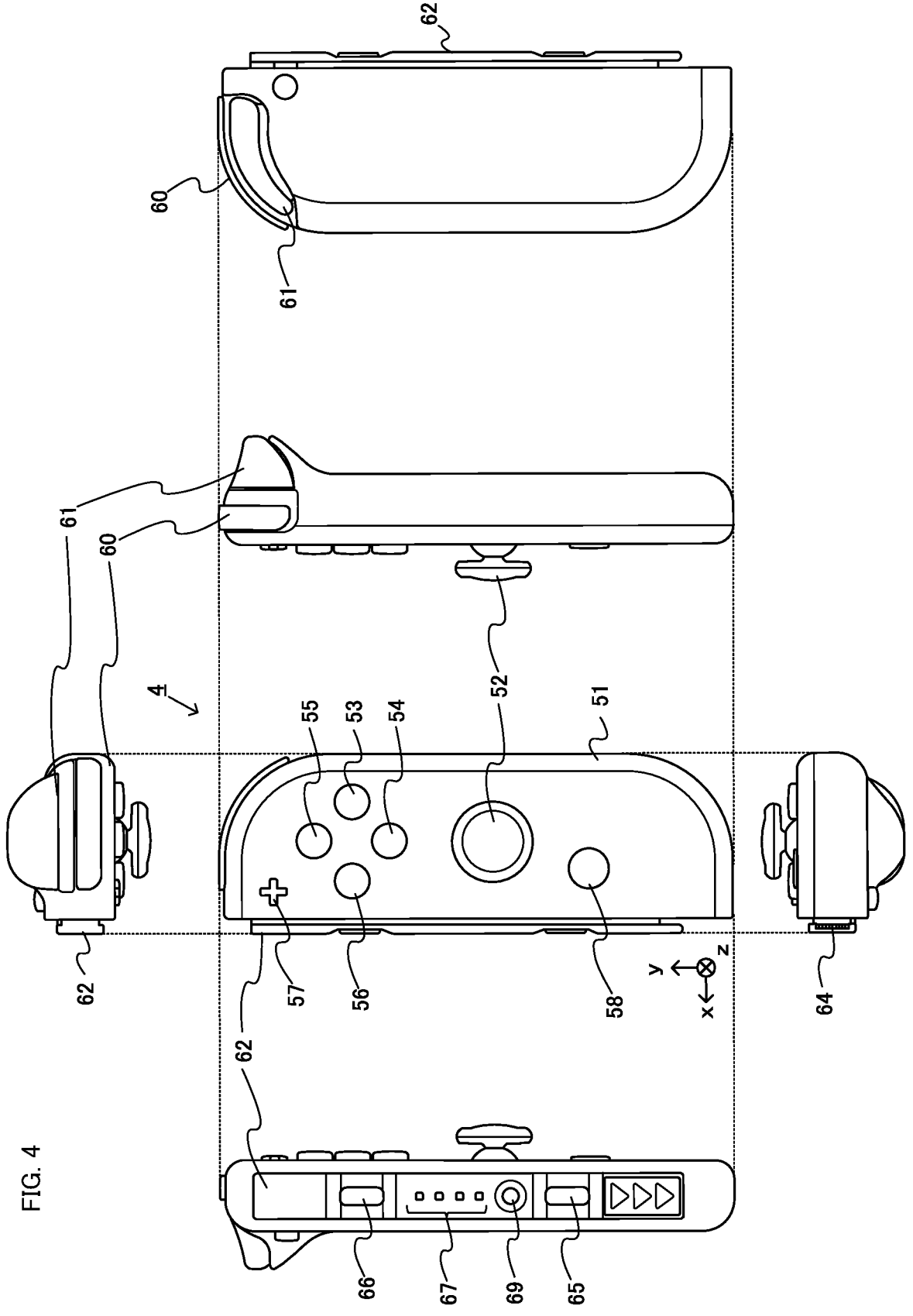
FIG. 4 is an example non-limiting six-sided view showing the right controller 4.

FIG. 4 is six orthogonal views showing an example of the right controller 4. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

(Overview of Game)

Figures 5, 6:
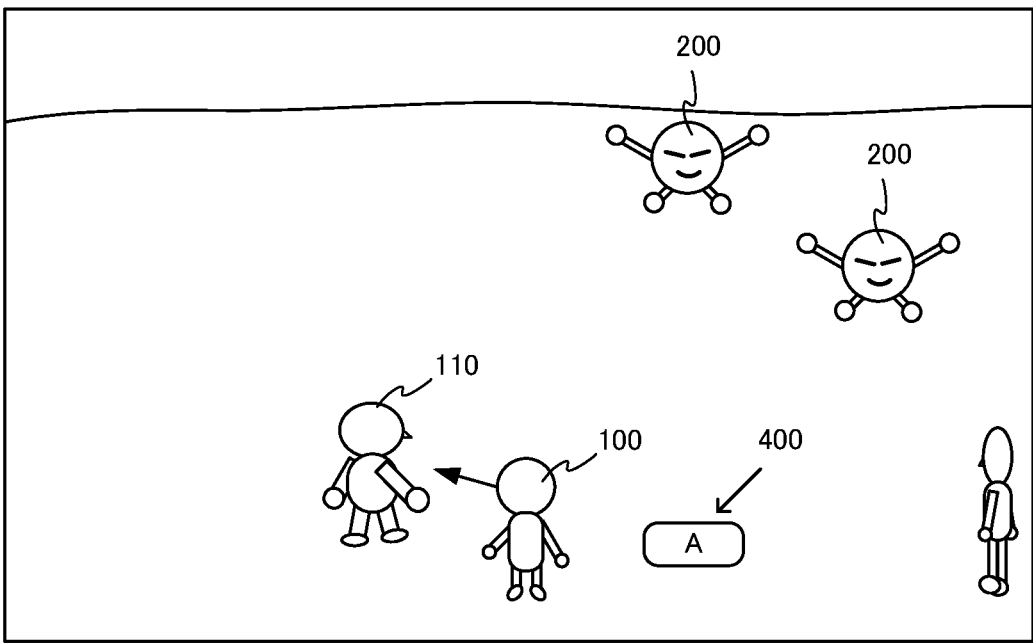
FIG. 5 is an example non-limiting diagram showing an example of a game image displayed on a display 12 or a stationary monitor in a case where a game according to an exemplary embodiment is executed.
FIG. 6 is an example non-limiting diagram showing an example of a game image displayed when a player character 100 comes close to a first NPC 110.

Next, a game according to the exemplary embodiment is described. FIG. 5 is a diagram showing an example of a game image displayed on the display 12 or the stationary monitor in a case where the game according to the exemplary embodiment is executed.

As shown in FIG. 5, a player character 100 and enemy characters 200 are placed in a three-dimensional virtual space (game space). The player character 100 is a character operated by a player, and for example, moves in the virtual space in accordance with an operation on the left analog stick 32. The enemy characters 200 are automatically controlled by the processor 81. Specifically, the enemy characters 200 move in the virtual space and attack the player character 100.

In accordance with an instruction given by the player, the player character 100 performs an attack action. First, the player character 100 can acquire and own a plurality of weapon objects during the progress of the game. Further, the player selects any of the plurality of weapon objects owned by the player character 100 and equips the player character 100 with the weapon object. Then, in accordance with an operation input provided by the player, the player character 100 performs an attack action using the weapon object with which the player character 100 is equipped.

If the attack action of the player character 100 hits an enemy character 200, damage is caused on the enemy character 200, and if the damage on the enemy character 200 exceeds a predetermined value, the enemy character 200 falls over. The player character 100 moves in the virtual space while defeating the plurality of enemy characters 200. The player character 100 has a life value, and if the player character 100 is attacked by an enemy character 200, the life value decreases. If the life value of the player character 100 reaches zero, the game is over. For example, the player character 100 returns to a saved point, and the game is resumed.

As shown in FIG. 5, a first non-player character (NPC) 110 and a second non-player character (NPC) 111 are placed in the virtual space. The first NPC 110 and the second NPC 111 are company characters of the player character 100 and are automatically controlled by the processor 81. If the player character 100 moves in the virtual space, the first NPC 110 and the second NPC 111 move by following the player character 100. For example, the first NPC 110 and the second NPC 111 automatically move in the virtual space so as not to separate by a predetermined distance or more from the player character 100. The first NPC 110 and the second NPC 111 also assist the player character 100. For example, the first NPC 110 and the second NPC 111 automatically fight with an enemy character 200 and defeat the enemy character 200.

Each of the first NPC 110 and the second NPC 111 is associated with a unique effect. If the player character 100 comes close to the first NPC 110 or the second NPC 111, the player character 100 becomes able to implement the effect associated with the first NPC 110 or the second NPC 111.

FIG. 6 is a diagram showing an example of a game image displayed when the player character 100 comes close to the first NPC 110. For example, the first NPC 110 and the second NPC 111 automatically move in accordance with the movement of the player character 100. If the player character 100 stops, the first NPC 110 and the second NPC 111 also stop. In this state, the player moves the player character 100 toward the first NPC 110 using the left analog stick 32. As shown in FIG. 6, if the player character 100 comes close to the first NPC 110 (if the distance between the player character 100 and the first NPC 110 becomes less than or equal to a predetermined value), for example, a button image 400 that urges the pressing of the A-button is displayed. At this time, if the player presses the A-button, the first NPC 110 enters the state where the first NPC 110 can implement a first action (a first effect) (hereinafter referred to as an "implementable state").

Figure 7:
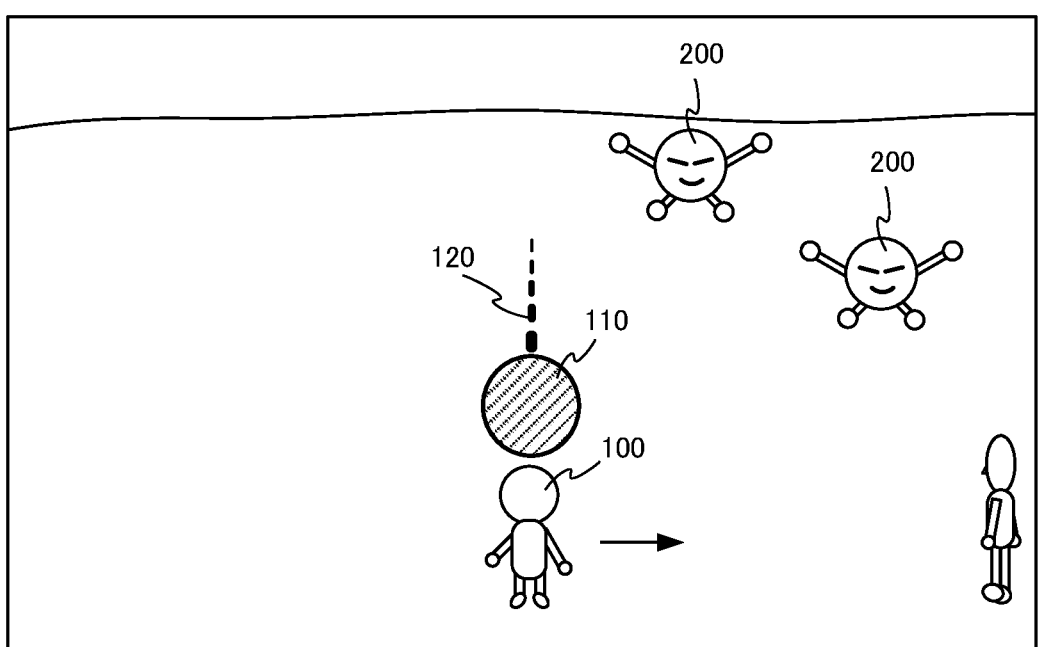
FIG. 7 is an example non-limiting diagram showing an example of a game image displayed when the first NPC 110 is in an implementable state.

FIG. 7 is a diagram showing an example of a game image displayed when the first NPC 110 is in the implementable state. As shown in FIG. 7, in the implementable state, the first NPC 110 forms into a shape that differs from that in a normal state, and for example, forms into a spherical shape. In a case where the first NPC 110 is in the implementable state, and if a shooting instruction (e.g., the pressing of the A-button) is given by the player, the first NPC 110 performs the first action. Specifically, the first NPC 110 is shot to the virtual space.

As shown in FIG. 7, a direction image 120 is displayed on the screen. The direction image 120 is an image indicating the shooting direction of the first NPC 110 and is a linear image extending along the ground in the depth direction of the screen. The first NPC 110 is shot in the direction indicated by the direction image 120. The details of the shooting direction of the first NPC 110 will be described below.

If the first NPC 110 enters the implementable state, the first NPC 110 is placed at a position further in the depth direction of the screen than the player character 100. Specifically, the player character 100 is placed to be located at a predetermined position in the direction of the line of sight of a virtual camera, and the first NPC 110 in the implementable state is located further in the direction of the line of sight of the virtual camera than the position of the player character 100. That is, if the first NPC 110 is in the implementable state, the virtual camera, the player character 100, and the first NPC 110 are placed to be arranged in order in the direction of the line of sight of the virtual camera. In this state, for example, if the right direction is input using the left analog stick 32, the player character 100 moves in the right direction, and the virtual camera and the first NPC 110 also move in the right direction.

Figure 8:
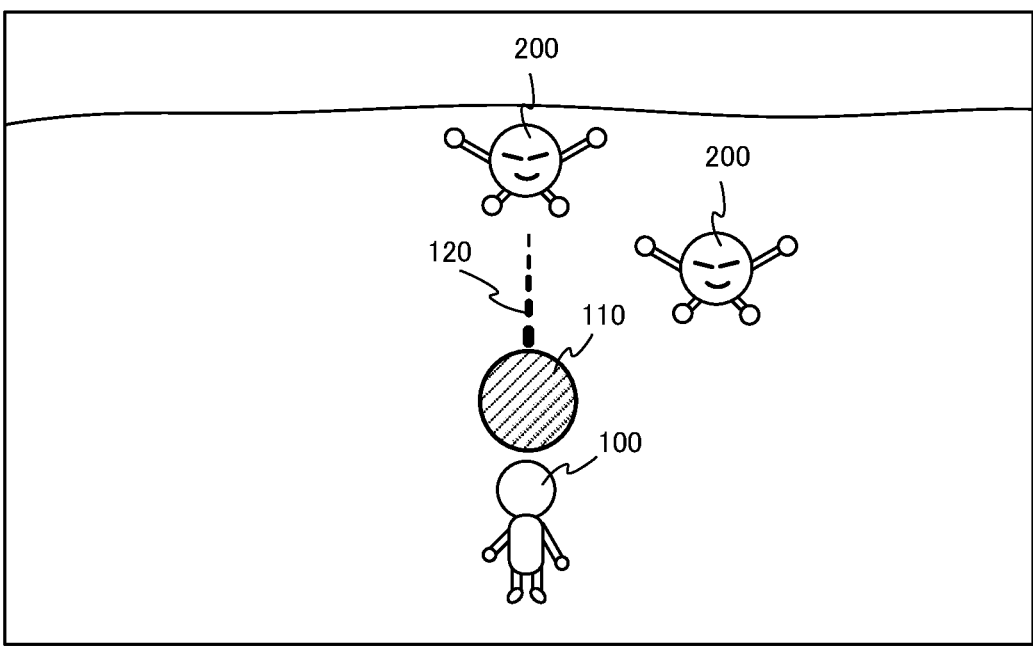
FIG. 8 is an example non-limiting diagram showing an example of a game image displayed after the player character 100 moves in the right direction from the state in FIG. 7.
Figure 9:
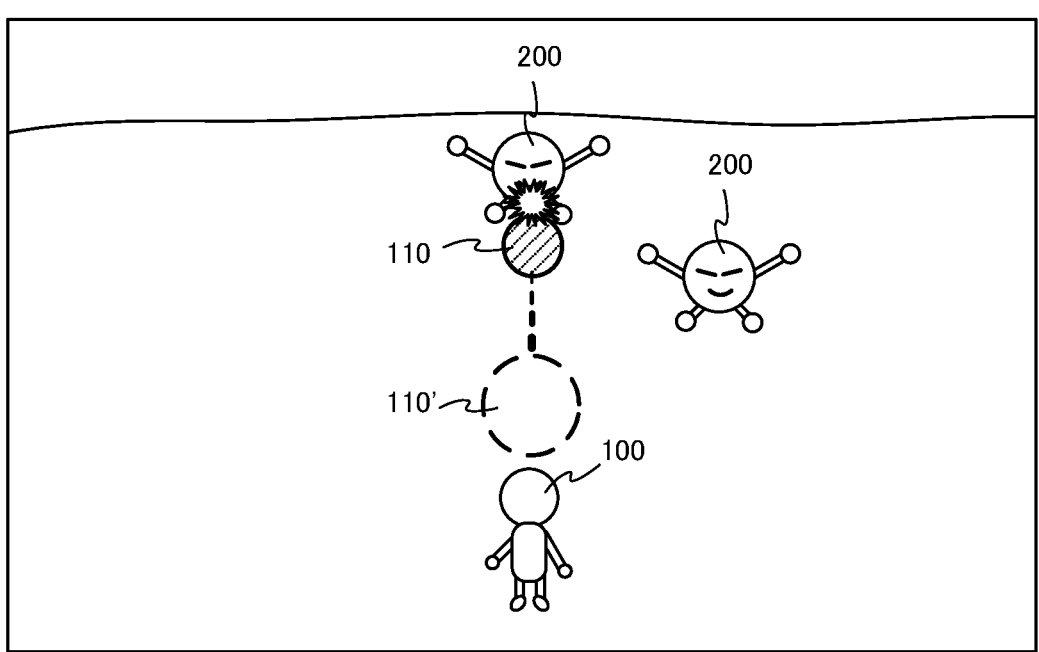
FIG. 9 is an example non-limiting diagram showing an example of a game image displayed when the first NPC 110 is shot in the state in FIG. 8.

FIG. 8 is a diagram showing an example of a game image displayed after the player character 100 moves in the right direction from the state in FIG. 7. FIG. 9 is a diagram showing an example of a game image displayed when the first NPC 110 is shot in the state in FIG. 8.

As shown in FIG. 8, after the player character 100 moves in the right direction, an enemy character 200 is located in front of the player character 100. At this time, if a shooting instruction (e.g., the pressing of the A-button) is given by the player, the first NPC 110 is shot by rolling on the ground. If the first NPC 110 is shot, the first NPC 110 enters the state where first NPC 110 is being shot. While first NPC 110 is being shot, the first NPC 110 moves in the direction indicated by the direction image 120. If the first NPC 110 that is being shot hits the enemy character 200, damage is caused on the enemy character 200. If the damage on the enemy character 200 exceeds a threshold, the enemy character 200 falls over. If the first NPC 110 hits the enemy character 200 once, the enemy character 200 may fall over.

As described above, the player character 100 can attack an enemy character 200 by not only performing an attack action using a weapon object owned by the player character 100, but also by shooting the first NPC 110.

Figure 10:
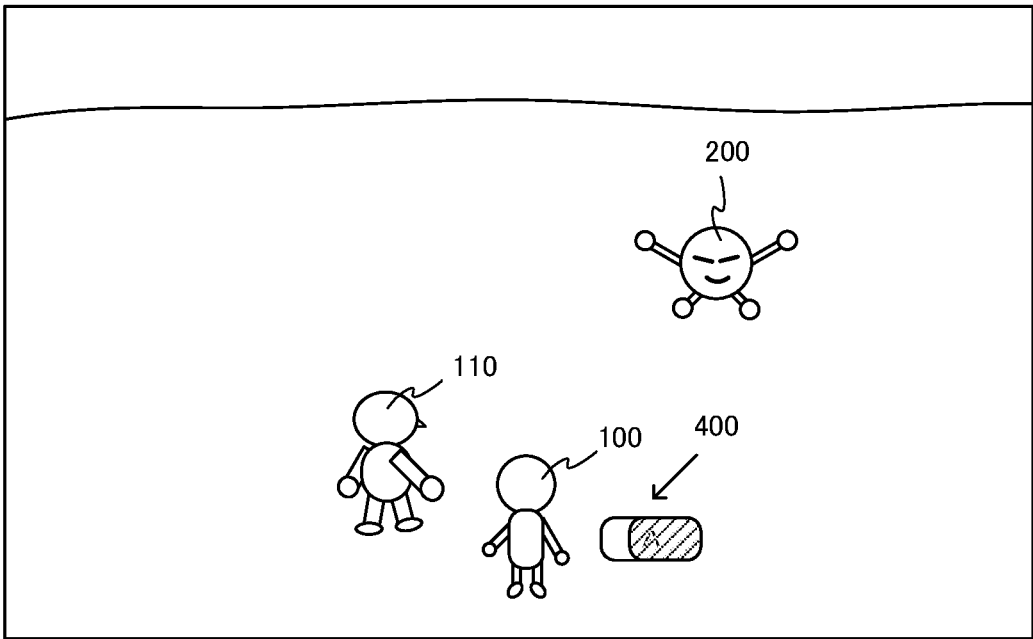
FIG. 10 is an example non-limiting diagram showing an example of a game image displayed immediately after the first NPC 110 returns to the vicinity of the player character 100 after is shot to the virtual space.

The shot first NPC 110 moves by a predetermined distance (or for a predetermined time) in the virtual space and then returns to the periphery of the player character 100. For example, the first NPC 110 comes down from above in the virtual space to the periphery of the player character 100. FIG. 10 is a diagram showing an example of a game image displayed immediately after the first NPC 110 returns to the periphery of the player character 100 after the first NPC 110 is shot to the virtual space.

As shown in FIG. 10, when the first NPC 110 is shot and returns to the periphery of the player character 100, the first NPC 110 is in a normal state (a non-implementable state) that is not the implementable state. If the first NPC 110 returns to the periphery of the player character 100, the first NPC 110 does not transition to the implementable state again until a predetermined restriction period elapses. For example, as shown in FIG. 10, during the predetermined restriction period, if the player character 100 moves close to the first NPC 110, the button image 400 changes to a display form indicating that the pressing of the A-button is not enabled. Specifically, a gauge is displayed in the button image 400, and the gauge extends in accordance with the lapse of time. If the predetermined restriction period elapses, the gauge of the button image 400 extends to the end, and the pressing of the A-button becomes enabled. If the A-button is pressed in this state, the first NPC 110 transitions to the implementable state again.

An obstacle object as an obstacle to the player character 100 is placed in the virtual space. The obstacle object hinders the movement of the player character 100 or causes damage on the player character 100. If the first NPC 110 is shot and hits the obstacle object, the obstacle object is destroyed or removed. For example, a rock object is placed in the virtual space. The rock object is an obstacle object that hinders the movement of the player character 100. If the shot first NPC 110 hits the rock object, the rock object is destroyed. Moreover, a plurality of obstacle objects other than the rock object are also placed in the virtual space. The player can advance the game while shooting the first NPC 110 to hit an obstacle object and destroying or removing the obstacle object.

Here, in the present specification, an object different from the player character 100, the NPCs (the first NPC and the second NPC 111), and the enemy characters 200 and capable of moving in the virtual space regardless of whether or not the object is currently moving is referred to as a "movable object". In the game according to the exemplary embodiment, the player character 100 can ride on a movable object capable of moving in the virtual space and move in the virtual space with the movable object.

Figure 11:
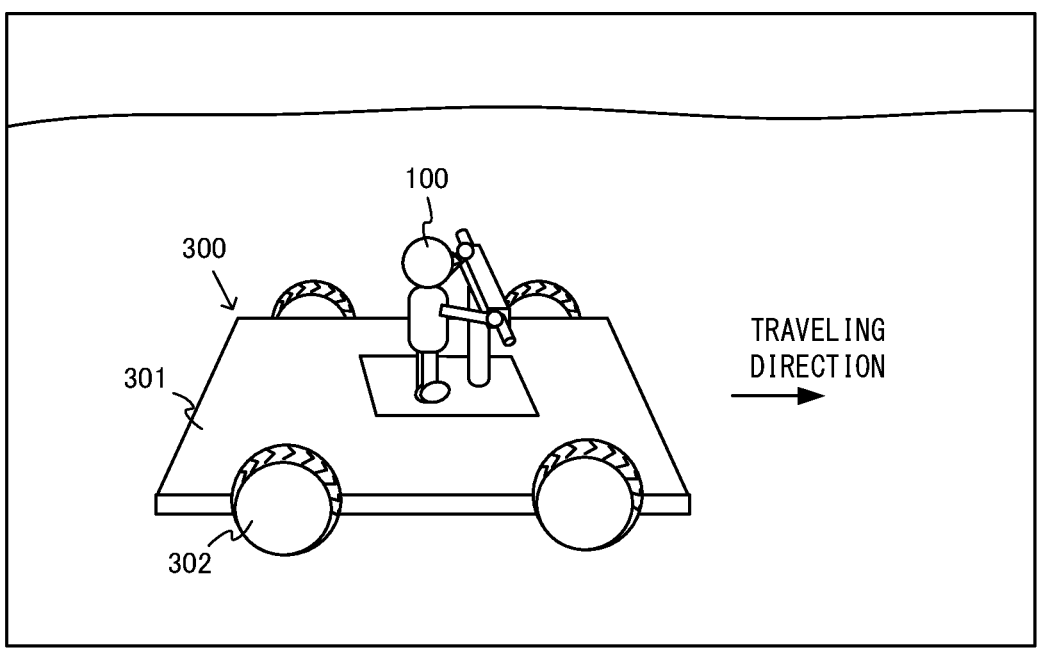
FIG. 11 is an example non-limiting diagram showing an example of a game image displayed when the player character 100 starts moving in the virtual space on a movable object.
Figure 12:
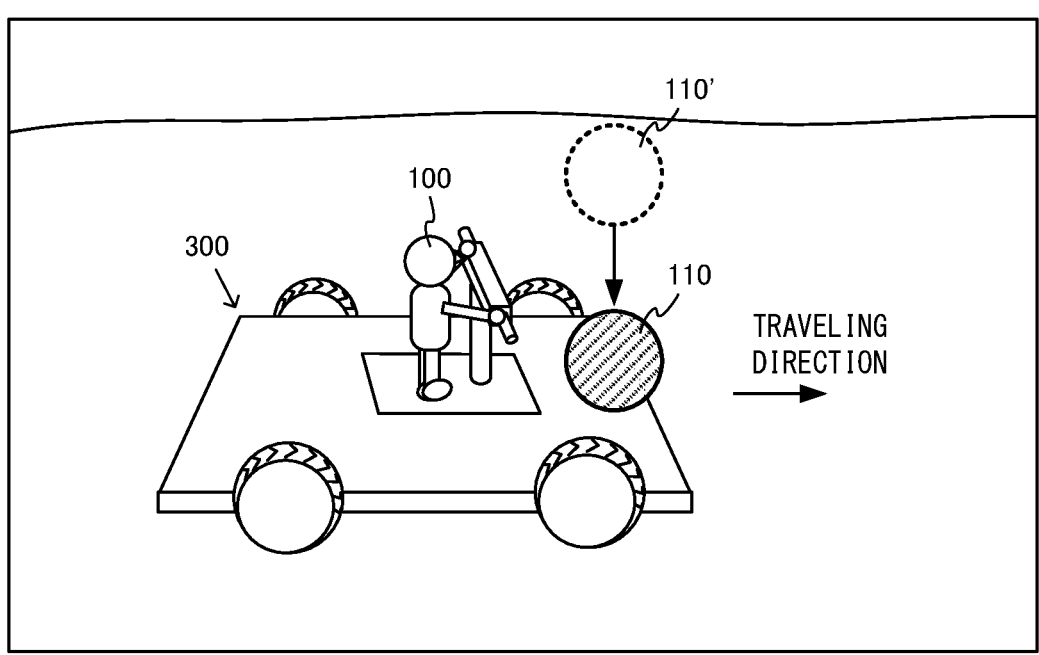
FIG. 12 is an example non-limiting diagram showing an example of a game image displayed after the player character 100 starts moving in the virtual space on the movable object.

FIG. 11 is a diagram showing an example of a game image displayed when the player character 100 starts moving in the virtual space on a movable object. FIG. 12 is a diagram showing an example of a game image displayed after the player character 100 starts moving in the virtual space on the movable object.

For example, as an example of the movable object, a vehicle object 300 is placed in the virtual space. Alternatively, components included in the vehicle object 300 (a plate-shaped object 301 that the player character 100 can ride on and a plurality of wheel objects 302) are placed in the virtual space. The player character 100 can create the vehicle object 300 by combining these components. The player character 100 rides on the vehicle object 300 at a stop and starts moving in a traveling direction in accordance with an instruction given by the player. Alternatively, the player character 100 rides on the vehicle object 300 that is moving, and moves with the vehicle object 300 in the virtual space.

The vehicle object 300 may automatically move in the traveling direction, or the traveling direction may be controlled in accordance with an operation input provided by the player. When the player character 100 is on the vehicle object 300, the position of the player character 100 on the vehicle object 300 may or may not be changed in accordance with an operation input provided by the player.

When the player character 100 is on the vehicle object 300, and if the vehicle object 300 moves, as shown in FIG. 12, the first NPC 110 is placed on the vehicle object 300. For example, the first NPC 110 comes down from above in the virtual space onto the vehicle object 300 and is placed at a predetermined position on the vehicle object 300. For example, the first NPC 110 is placed at a position different from that of the player character 100 and at a front position on the vehicle object 300 (a position on the front side in the traveling direction). In FIG. 12, a dashed line 110' indicates the first NPC before being placed on the vehicle object 300.

Specifically, if the moving velocity of the vehicle object 300 is greater than or equal to a threshold in the state where the player character 100 is on the vehicle object 300, the first NPC 110 is placed on the vehicle object 300. At this time, the first NPC 110 is placed in the implementable state.

That is, when the player character 100 is not on the movable object, and if the player character 100 comes close to the first NPC 110 and an instruction (the pressing of the A-button) is given by the player, the first NPC 110 is caused to transition to the implementable state. On the other hand, in a case where the player character 100 is on the movable object and the movable object moves at a predetermined velocity or more, and even if the player character 100 does not come close to the first NPC 110 and an instruction is not given by the player, the first NPC 110 enters the implementable state. The player character 100 and the first NPC 110 in the implementable state move in the virtual space while remaining on the vehicle object 300.

Figure 13:
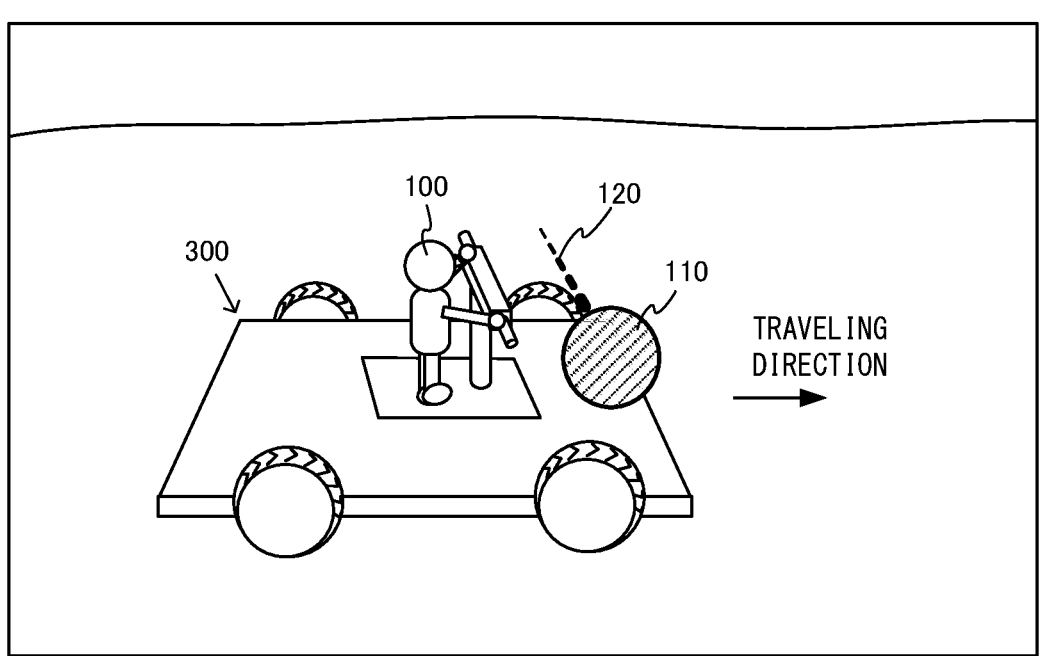
FIG. 13 is an example non-limiting diagram showing an example of a game image displayed when the player character 100 and the first NPC 110 move in the virtual space on a vehicle object 300.
Figure 14:
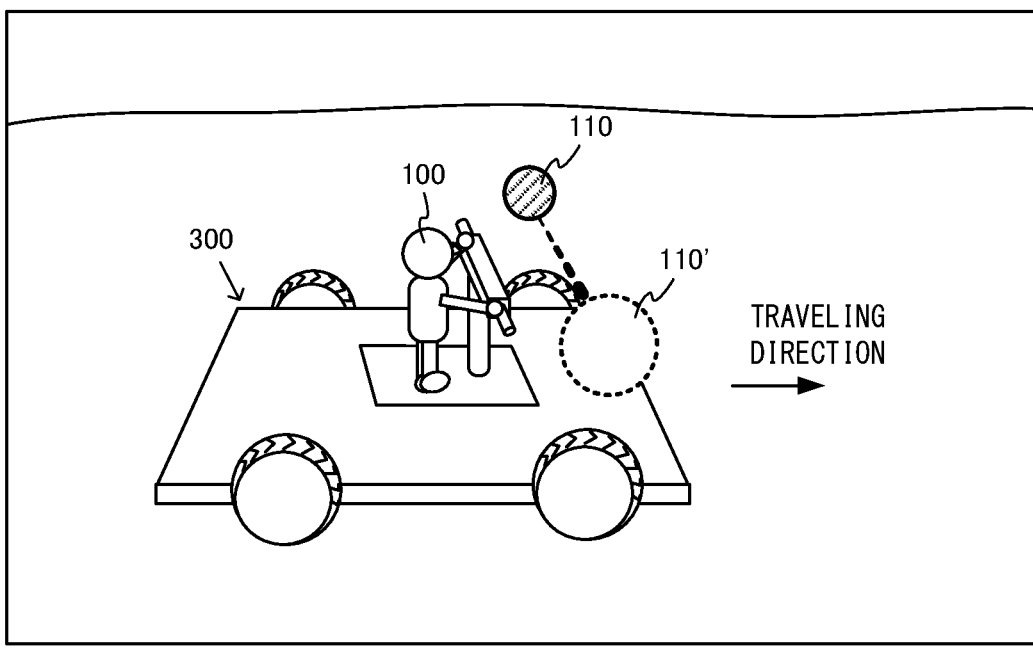
FIG. 14 is an example non-limiting diagram showing an example of a game image displayed when the first NPC 110 is shot.

FIG. 13 is a diagram showing an example of a game image displayed when the player character 100 and the first NPC 110 move in the virtual space on the vehicle object 300. FIG. 14 is a diagram showing an example of a game image displayed when the first NPC 110 is shot.

As shown in FIG. 13, the direction image 120 is included in the game image. If a shooting instruction (e.g., the pressing of the A-button) is given by the player in this state, the first NPC 110 is shot in the direction indicated by the direction image 120. The shooting direction of the first NPC 110 is the depth direction of the screen.

As described above, the player character 100 can shoot the first NPC 110 in the state where the player character 100 is moving on the vehicle object 300. The player character 100 can attack an enemy character 200 or destroy an obstacle object.

The player character 100 can ride on a flying object 310 instead of the vehicle object 300 and fly in the virtual space.

Figure 15:
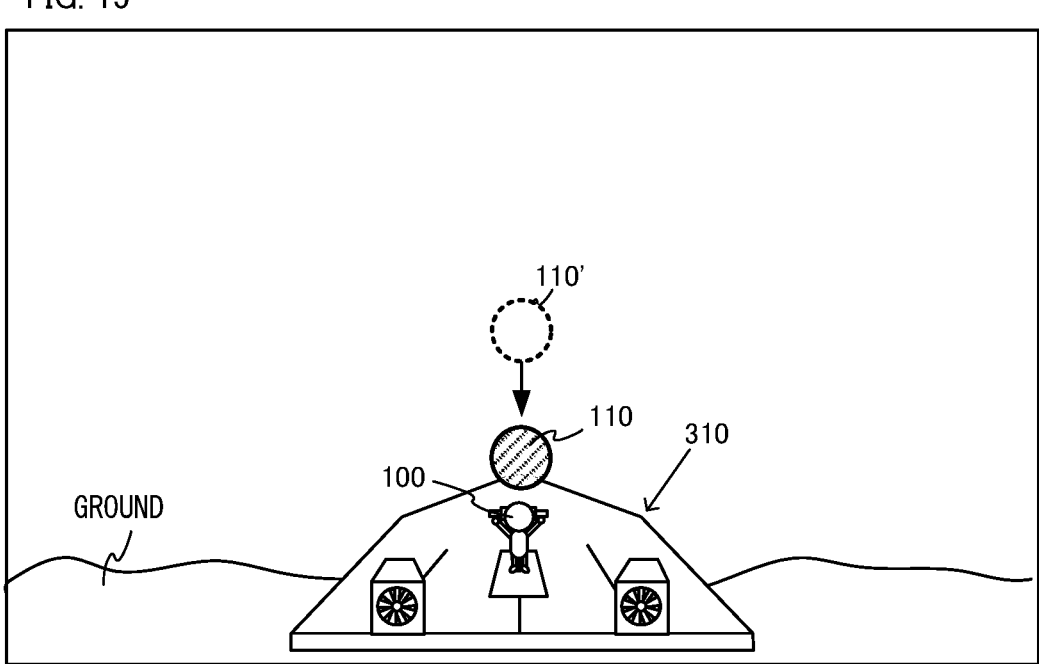
FIG. 15 is an example non-limiting diagram showing an example of a game image displayed when the player character 100 starts flying in the virtual space on a flying object 310.
Figure 16:
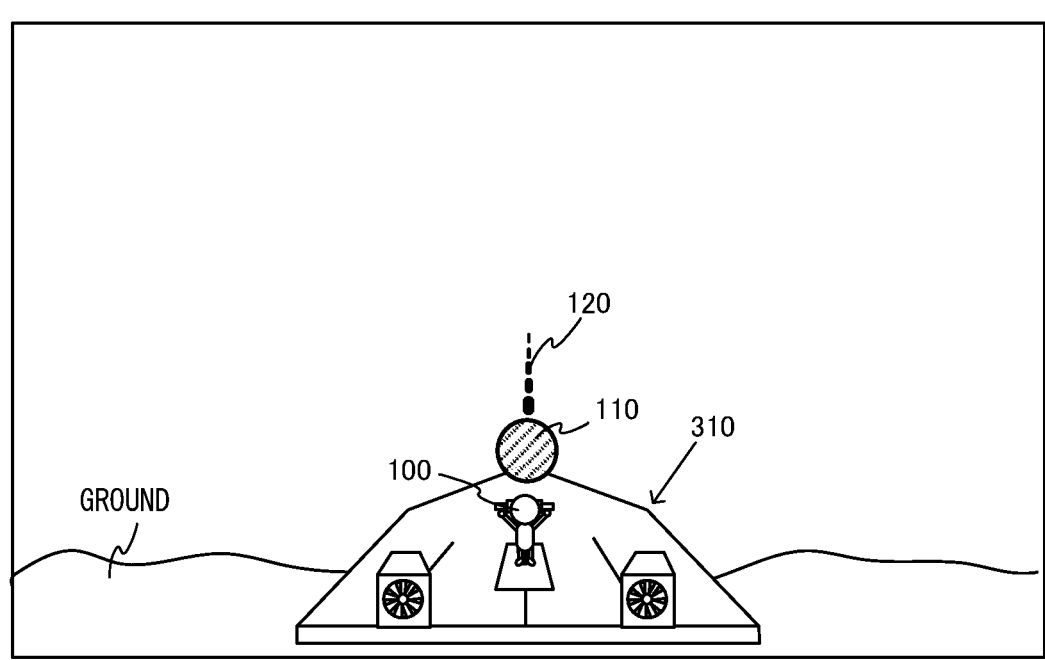
FIG. 16 is an example non-limiting diagram showing an example of a game image displayed when the player character 100 and the first NPC 110 are flying in the virtual space on the flying object 310.

FIG. 15 is a diagram showing an example of a game image displayed when the player character 100 starts flying in the virtual space on the flying object 310. FIG. 16 is a diagram showing an example of a game image displayed when the player character 100 and the first NPC 110 fly in the virtual space on the flying object 310.

For example, the flying object 310 may be placed in the virtual space in advance, or may be created by the player character 100 using component objects. Based on an operation input provided by the player, the player character 100 rides on the flying object 310 at rest (or the flying object 310 that is moving) in the virtual space. Then, the flying object 310 flies in the virtual space. As shown in FIG. 15, if the velocity of the flying object 310 is greater than or equal to a threshold, the first NPC 110 comes down from above in the virtual space onto the flying object 310 and is placed on the flying object 310. Specifically, the first NPC 110 is placed in the implementable state at a predetermined position on the flying object 310. For example, the first NPC 110 in the implementable state is placed at a position different from that of the player character 100 and at a position on the front side of the flying object 310.

As shown in FIG. 16, when the flying object 310 is flying in the virtual space, the linear direction image 120 extending from the position of the first NPC 110 in the depth direction of the screen is displayed.

Figure 17:
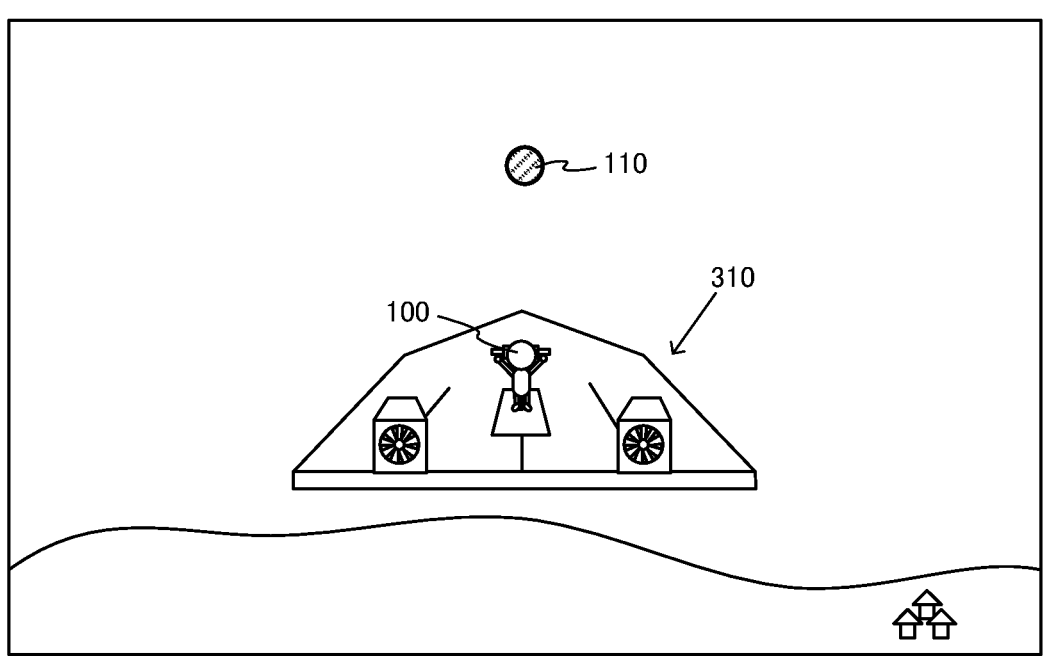
FIG. 17 is an example non-limiting diagram showing an example of a game image displayed when the first NPC 110 is shot.
Figure 18:
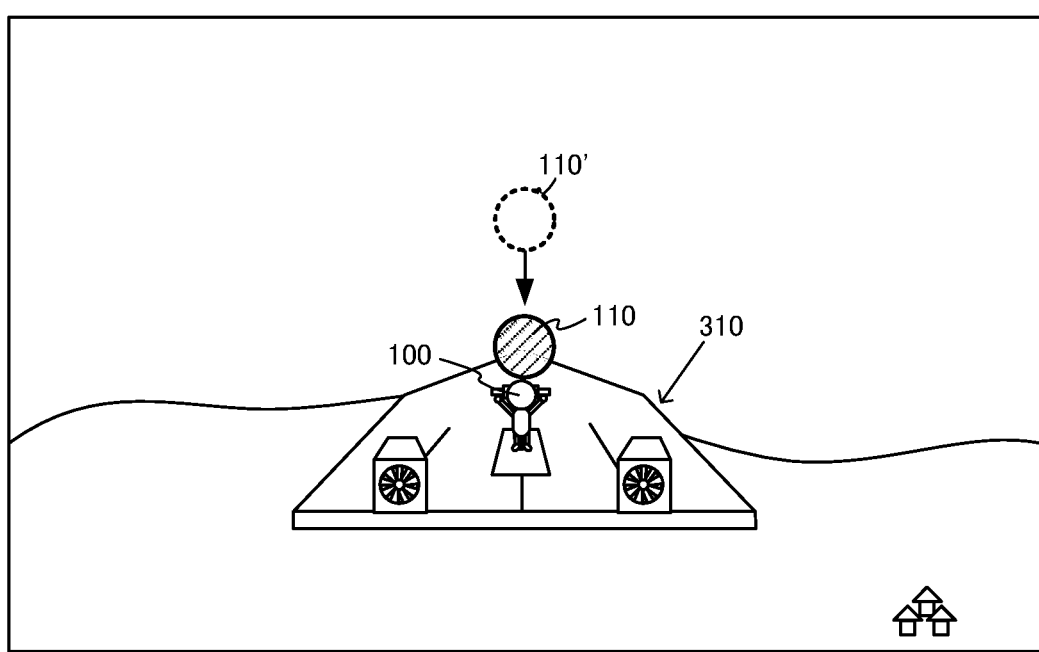
FIG. 18 is an example non-limiting diagram showing an example of a game image displayed when the first NPC 110 is placed on the flying object 310 again after being shot.

FIG. 17 is a diagram showing an example of a game image displayed when the first NPC 110 is shot. FIG. 18 is a diagram showing an example of a game image displayed when the first NPC 110 is placed on the flying object 310 again after being shot.

As shown in FIG. 17, if the player character 100 and the first NPC 110 are on the flying object 310, in accordance with a shooting instruction given by the player (e.g., the pressing of the A-button), the first NPC 110 is shot. The shot first NPC 110 rolls along the upper surface of the flying object 310 and moves by a predetermined distance (or for a predetermined time) in the virtual space. For example, if the shot first NPC 110 hits an enemy character, the enemy character becomes damaged.

As shown in FIG. 18, after the first NPC 110 is shot, the first NPC 110 moves to the flying object 310 and is placed on the flying object 310 again. Specifically, if the player character 100 rides on the flying object 310 and the flying object 310 is moving at a predetermined velocity or more, the first NPC 110 comes down from above in the virtual space onto the flying object 310 and is placed on the flying object 310 in the implementable state. If the player gives a shooting instruction, the first NPC 110 is shot again.

As described above, if the player character 100 rides on a movable object capable of moving in the virtual space and the movable object moves at a predetermined velocity or more, the first NPC 110 is placed on the flying object 310 and enters the implementable state. Then, in accordance with a shooting instruction given by the player, the first NPC 110 is shot.

In FIGS. 13 and 16, the first NPC 110 is placed in contact with the upper surface of the movable object, but the first NPC 110 may not necessarily be placed in contact with the movable object. For example, the first NPC 110 may be placed such that a part of the first NPC 110 protrudes from the movable object in the implementable state. Alternatively, the first NPC 110 may be placed to be off the upper surface of the movable object in the implementable state and move with the movable object. Yet alternatively, the first NPC 110 may be placed to dangle under the movable object. Even in such a state, it can be said that the first NPC 110 is placed on the movable object.

Next, the setting of the shooting direction of the first NPC 110 is described. The shooting direction of the first NPC 110 is set in accordance with an operation input provided by the player. The shooting direction of the first NPC 110 is set based on the direction of the line of sight of the virtual camera and the direction of the movable object that the first NPC 110 is on.

Figure 19:
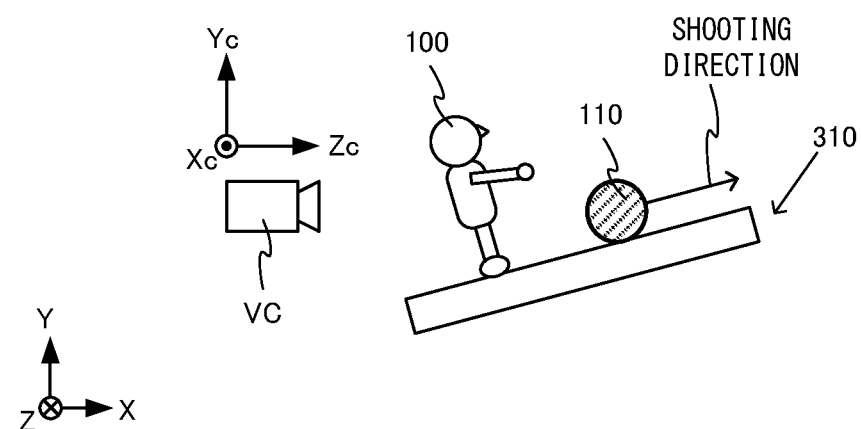
FIG. 19 is an example non-limiting diagram illustrating a pitch direction component of the shooting direction of the first NPC 110.
Figure 20:
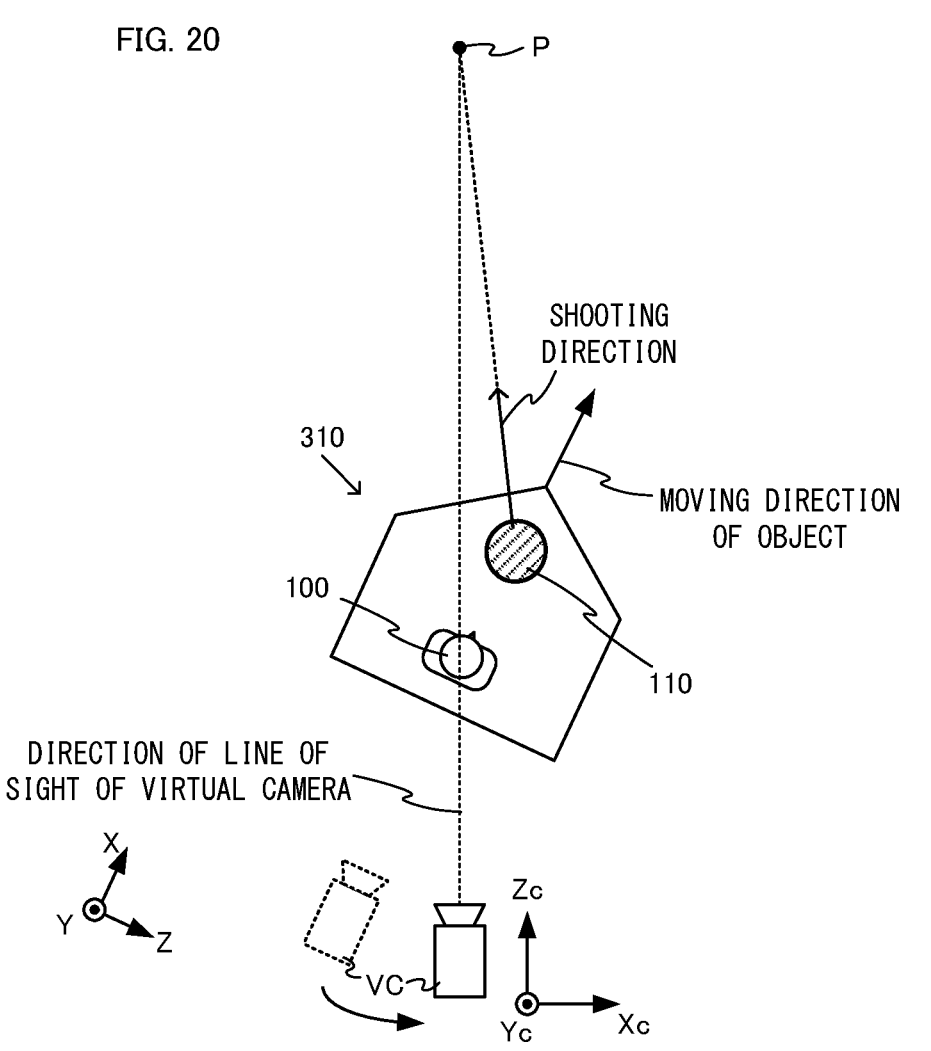
FIG. 20 is an example non-limiting diagram illustrating a yaw direction component of the shooting direction of the first NPC 110.

FIG. 19 is a diagram illustrating a pitch direction component of the shooting direction of the first NPC 110. FIG. 20 is a diagram illustrating a yaw direction component of the shooting direction of the first NPC 110.

FIG. 19 shows a diagram of the player character 100 on the flying object 310 when viewed from the horizontal direction in the virtual space. As shown in FIG. 19, a fixed XYZ coordinate system is set in the virtual space. The Y-axis is an axis in the up direction in the virtual space and the X-axis and the Z-axis are axes perpendicular to the Y-axis and parallel to the ground. For a virtual camera VC, an XcYcZc coordinate system fixed to the virtual camera VC is set. The Zc axis is an axis in the direction of the line of sight of the virtual camera VC, the Xc axis is an axis in the right direction of the virtual camera VC, and the Yc axis is an axis in the up direction of the virtual camera VC.

Based on an operation input provided by the player, the flying object 310 rotates in a pitch direction (the up-down direction in the virtual space). The flying object 310 is rotated in the pitch direction, thereby rising and falling in the virtual space. For example, based on the input direction of the left analog stick 32, the flying object 310 rotates in the pitch direction.

The first NPC 110 is shot in a direction along the surface of the movable object that the first NPC 110 is on (here, the flying object 310). That is, if the surface of the movable object that the first NPC 110 is on is parallel to the ground, the shooting direction of the first NPC 110 is a direction parallel to the ground with respect to the pitch direction. If the surface of the movable object that the first NPC 110 is on is rotating in the pitch direction (i.e., the movable object is directed upward or downward in the virtual space), the shooting direction of the first NPC 110 is rotated with respect to the pitch direction. For example, as shown in FIG. 19, if the flying object 310 is directed in the up direction in the virtual space, the shooting direction of the first NPC 110 is also the up direction in the virtual space.

FIG. 20 shows a diagram of the virtual camera VC, the player character 100, and the first NPC 110 when viewed from the Yc axis negative direction of the virtual camera VC. As shown in FIG. 20, the virtual camera VC is placed to include the player character 100 in the field of view of the virtual camera VC. The player character 100 is located in the direction of the line of sight of the virtual camera VC. The virtual camera VC rotates about the player character 100 in accordance with an operation input provided by the player (e.g., a direction input to the right analog stick 52). For example, if an operation input is not provided to the right analog stick 52, the virtual camera VC is located behind the player character 100 (a dashed line in FIG. 20). For example, if the left-right direction of the right analog stick 52 is input, the virtual camera VC rotates about the player character 100 in a yaw direction (the left-right direction) in the virtual space (a solid line in FIG. 20).

A yaw direction component of the shooting direction of the first NPC 110 is set based on the direction of the line of sight of the virtual camera VC. Specifically, as shown in FIG. 20, a point P is set ahead in the direction of the line of sight of the virtual camera VC, and the shooting direction of the first NPC 110 is set to the direction from the position of the first NPC 110 to the point P. That is, the yaw direction component of the shooting direction of the first NPC 110 is set based on the rotation of the virtual camera VC in the yaw direction. Thus, if a shooting instruction is given, the first NPC 110 is shot approximately in the depth direction of the screen, but does not necessarily match the direction of the line of sight of the virtual camera. The shooting direction of the first NPC 110 may match the direction of the line of sight of the virtual camera VC.

As described above, the pitch direction (the up-down direction) is set in accordance with the direction of the movable object that the first NPC 110 is on, and the yaw direction (the left-right direction) is set in accordance with the direction of the virtual camera VC. Based on the rotation in the set pitch direction and the rotation in the set yaw direction, the shooting direction of the first NPC 110 is set.

Also when the player character 100 and the first NPC 110 are on the vehicle object 300, the shooting direction of the first NPC 110 is set by a similar method. That is, a pitch direction component of the shooting direction of the first NPC 110 is set in accordance with the rotation of the vehicle object 300 in the pitch direction. For example, the vehicle object 300 moves along the ground in the virtual space. If the ground is tilted up and down, the vehicle object 300 is also tilted up and down. In accordance with the up and down tilt of the vehicle object 300, the shooting direction of the first NPC 110 is also tilted up and down. A yaw direction component of the shooting direction of the first NPC 110 is set in accordance with the rotation of the virtual camera VC in the yaw direction.

In the game according to the exemplary embodiment, another object other than the above vehicle object 300 and flying object 310 can also be a movable object. The player character 100 can ride on various movable objects capable of moving in the virtual space. For example, as a movable object, there may be a trolley object capable of moving on tracks, or there may be a ship object capable of moving on a water surface. An object without wheels is also a movable object in a case where the object is configured to move on the ground. For example, if there is a plate-shaped object without wheels, and the plate-shaped object slides on the ground in the virtual space, the plate-shaped object is a movable object. For example, the player character 100 rides on a plate-shaped object sliding on a slope and moves in the virtual space. In a case where the player character 100 rides on such a movable object, and if the moving velocity of the movable object is greater than or equal to a predetermined value, the first NPC 110 rides on the movable object and enters the implementable state.

As described above, in the game according to the exemplary embodiment, if the player character 100 is on a movable object and the movable object is moving, the first NPC 110 is placed on the movable object in the implementable state. When the player character 100 is on the movable object, the first NPC 110 is placed on the movable object in the implementable state without even moving the player character 100 close to the first NPC 110 and pressing the A-button. Thus, even if the player character 100 is on the movable object, it is possible to make it easy to shoot the first NPC 110. That is, when the player character 100 is moving on the movable object, it is difficult for the player to finely control the position of the player character 100 and bring the player character 100 close to the first NPC 110 placed in the virtual space, but the first NPC 110 automatically rides on the movable object, and therefore, it is possible to make it easy to bring the first NPC 110 into the implementable state and shoot the first NPC 110.

When the player character 100 is moving on a movable object, the first NPC 110 enters the implementable state without even bringing the player character 100 close to the first NPC 110 and pressing the A-button. Thus, it is possible to immediately shoot the first NPC 110. After the first NPC 110 is shot, the first NPC 110 is in the non-implementable state while being shot, but if a predetermined time elapses, the first NPC 110 moves onto the movable object and enters the implementable state again. Thus, when the player character 100 is moving on the movable object, it is possible to repeatedly shoot the first NPC 110 in a relatively short time. For example, when the player wishes to attack an enemy character, it is possible to shoot the first NPC 110. Thus, it is possible to avoid losing an opportunity to shoot.

When the player character 100 is not on a movable object (i.e., is on the ground), and if the player character 100 comes close to the first NPC 110 and the A-button is pressed, the first NPC 110 enters the implementable state. In this state, the first NPC 110 is shot in accordance with a shooting instruction. After the first NPC 110 is shot, the first NPC 110 returns to the periphery of the player character 100, and further, until a predetermined restriction period elapses, the first NPC 110 is maintained in the non-implementable state even if the player character 100 comes close to the first NPC 110. If, on the other hand, the player character 100 is on a movable object, and after the first NPC 110 is shot, the first NPC is in the non-implementable state until the first NPC 110 returns onto the movable object, but the predetermined restriction period is not provided. Then, at the time when the first NPC 110 returns onto the movable object, the first NPC enters the implementable state. Consequently, if the player character 100 is on a movable object, it is possible to shoot the first NPC 110 without waiting for the predetermined restriction period to elapse, and it is possible to continuously shoot the first NPC 110 in a relatively short time.

The first NPC 110 is shot in a direction based on the direction of the line of sight of the virtual camera. Thus, it is possible to always shoot the first NPC 110 in the depth direction of the screen, and it is easy to take aim. The first NPC 110 is shot in a direction along the surface of the movable object that the first NPC 110 is on. Thus, it is easy to take aim, and it is possible to shoot the first NPC 110 to the virtual space without the first NPC 110 slipping through the surface of the movable object or hitting the surface. The moving direction of the movable object and the direction of the line of sight of the virtual camera are independent of each other, and therefore, it is possible to determine the shooting direction without being limited to the moving direction.

(Description of Data Used in Game Processing)

Next, the details of game processing are described. First, data used in the game processing is described. FIG. 21 is a diagram showing an example of data stored in a memory of the main body apparatus 2 during the execution of the game processing.

As shown in FIG. 21, the memory (the DRAM 85, the flash memory 84, or the external storage medium) of the main body apparatus 2 stores a game program, operation data, player character data, first NPC data, second NPC data, enemy character data, movable object data, and obstacle object data. As well as these, various pieces of data are stored in the memory.

The game program is a program for executing the game processing described below. The game program is stored in advance in the external storage medium attached to the slot 23 or the flash memory 84, and when the game is executed, is loaded into the DRAM 85. The game program may be acquired from another apparatus via a network (e.g., the Internet).

The operation data is data regarding operations acquired from the left controller 3 and the right controller 4. For example, the operation data includes data relating to operations on the left and right analog sticks and data relating to operations on the buttons. For example, the operation data is transmitted from the left controller 3 and the right controller 4 to the main body apparatus 2 at predetermined time intervals (e.g., $\frac{1}{200}$-second intervals) and stored in the memory.

The player character data is data regarding the player character 100 and includes data regarding the position in the virtual space, the direction, the moving direction, the moving velocity, and the like of the player character 100. The player character data also includes data indicating whether or not the player character 100 is on a movable object. The player character data also includes the life value of the player character 100. The player character data also includes data regarding the external appearance such as the shape of the player character 100.

The first NPC data is data regarding the above first NPC 110. Specifically, the first NPC 110 includes data regarding the position in the virtual space, the direction, the moving direction, the moving velocity, and the like of the first NPC 110. The first NPC data also includes data regarding the state of the first NPC 110. Specifically, the first NPC data includes, as the data regarding the state of the first NPC 110, data indicating whether or not the first NPC 110 is in the implementable state, data indicating whether or not the first NPC 110 is on a movable object, and data indicating whether or not the first NPC 110 is being shot. The first NPC data also includes data indicating the external appearance such as the shape of the first NPC 110.

The second NPC data is data regarding the above second NPC 111. Specifically, the second NPC data includes data regarding the position in the virtual space, the direction, the moving direction, the moving velocity, and the like of the second NPC 110. The second NPC data also includes data indicating the external appearance such as the shape of the second NPC 111. The second NPC data also includes data indicating whether or not a second effect related to the second NPC 111 is being implemented.

Further, a third NPC and a fourth NPC may be placed in addition to the first NPC 110 and the second NPC 111 in the virtual space. In this case, data regarding the third NPC and the fourth NPC is stored in the memory. Each of the third NPC and the fourth NPC is associated with a unique effect.

The enemy character data is data regarding the plurality of enemy characters 200 placed in the virtual space. The enemy character data includes data regarding the position in the virtual space, the direction, the moving direction, the moving velocity, and the like of each enemy character 200. The enemy character data also includes the life value of each enemy character 200. The enemy character data also includes data regarding the external appearance such as the shape of each enemy character 200 and data regarding the attribute of each enemy character 200.

The movable object data is data regarding objects capable of moving in the virtual space (e.g., the vehicle object 300 and the flying object 310). The movable object data includes data regarding the position, the direction, the velocity, and the moving direction of each movable object. The movable object data also includes data regarding the external appearance such as the shape of each movable object.

The obstacle object data is data regarding an obstacle object placed in the virtual space. The obstacle object data includes data regarding the position and the properties of the obstacle object.

(Details of Game Processing Performed by Main Body Apparatus 2)

Figure 22:
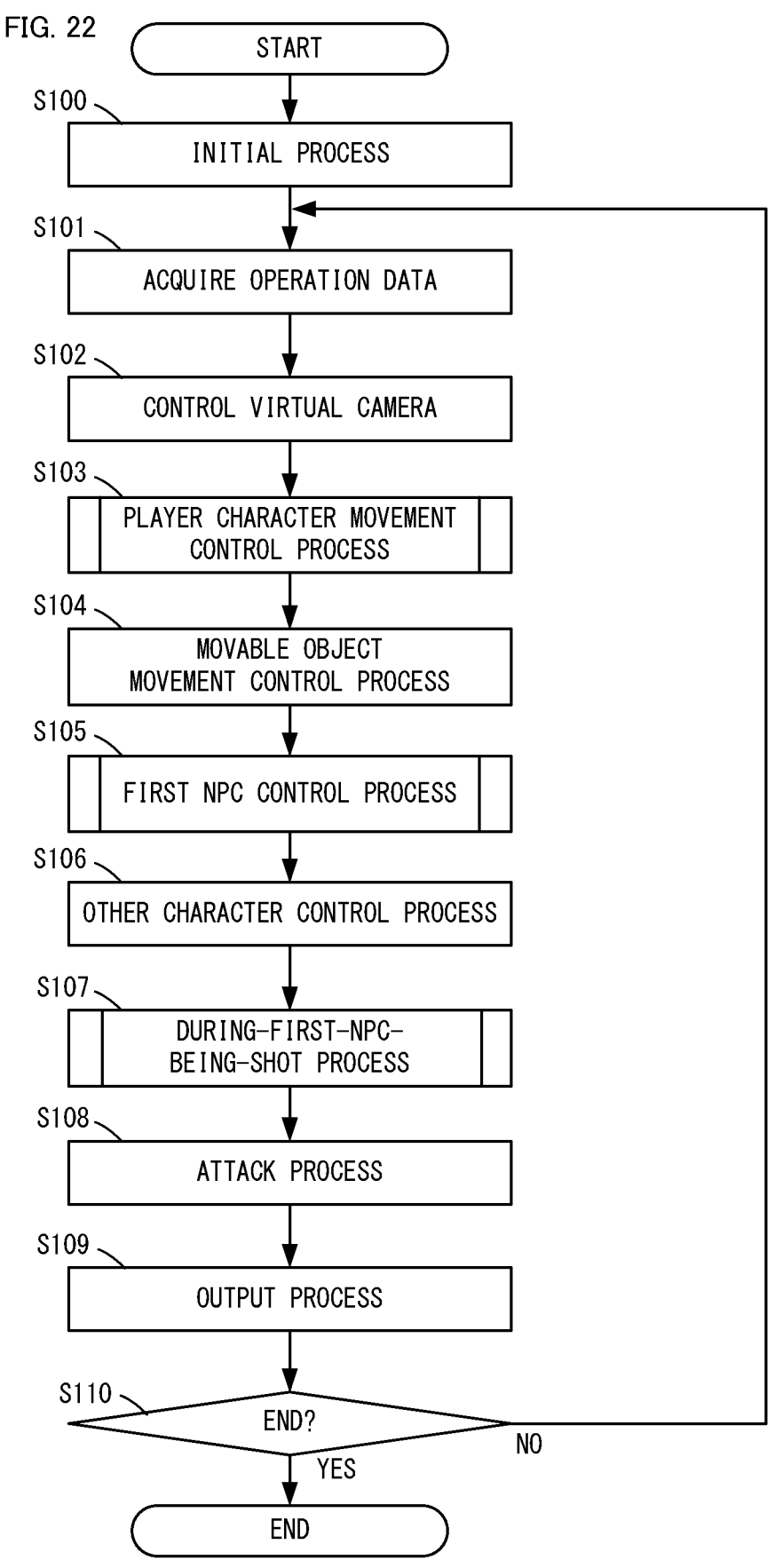
FIG. 22 is an example non-limiting flow chart showing an example of game processing executed by a processor 81 of the main body apparatus 2.

Next, the details of game processing performed by the main body apparatus 2 are described. FIG. 22 is a flow chart showing an example of game processing executed by the processor 81 of the main body apparatus 2.

As shown in FIG. 22, first, the processor 81 executes an initial process (step S100). Specifically, the processor 81 sets the three-dimensional virtual space and places the player character 100, the enemy characters 200, the first NPC 110, the second NPC 111, the virtual camera, movable objects, an obstacle object, and the like in the virtual space. After executing the initial process, the processor 81 repeatedly executes the processes of subsequent steps S101 to S110 at predetermined frame time intervals (e.g., 1/60-second intervals).

In step S101, the processor 81 acquires operation data from the controllers. The operation data includes data regarding the operation states of the buttons and the analog sticks of the left controller 3, the buttons and the analog sticks of the right controller 4, and the like. In step S101, the processor 81 acquires the operation data transmitted from the controllers and stored in the memory.

Next, the processor 81 performs a virtual camera control process (step S102). Here, for example, in accordance with the input direction of the right analog stick 52, the processor 81 rotates the virtual camera VC about the player character 100. For example, if the player character 100 is on a movable object, in accordance with the input of the left-right direction of the right analog stick 52, the processor 81 rotates the virtual camera VC in the yaw direction in the virtual space. In accordance with the input of the up-down direction of the right analog stick 52, the processor 81 also rotates the virtual camera VC in the pitch direction in the virtual space.

Next, the processor 81 performs a player character movement control process (step S103). Here, based on the operation data, the process of moving the player character 100 in the virtual space, or causing the player character 100 to ride on a movable object, or if the player character 100 is on a movable object, moving the movable object is performed. Here, the process of causing the first NPC 110 to transition to the implementable state is also performed. The details of the player character movement control process in step S103 will be described below.

Next, the processor 81 performs a movable object movement control process (step S104). Here, physical calculations based on the laws of physics are performed regarding each movable object in the virtual space, thereby controlling the movement of the movable object. Specifically, the processor 81 performs physical calculations based on the moving velocity of the movable object, a force applied to the movable object, and the mass, the gravity, the friction with the ground, the air resistance, and the like of the movable object. In accordance with the results of the physical calculations, the processor 81 controls the movement of the movable object. Consequently, the position and the moving velocity (the velocity and the moving direction) of each movable object are updated. For example, if a movable object includes a power object that generates power, the power of the power object is also taken into account. If the player character 100 is on a movable object, the mass of the player character 100 is also taken into account. If the player character 100 is on a movable object, in accordance with an operation of the player, the moving velocity (the velocity and the moving direction) of the movable object may be changed. For example, if the player character 100 is on a movable object, in accordance with a direction operation of the player, the moving direction of the movable object may be changed. For example, when the player character 100 is on the flying object 310 and the flying object 310 is flying in the air, and if the position of the player character 100 on the flying object 310 changes, the tilt of the flying object 310 may change, and the moving direction of the flying object 310 may change. If the player character 100 is on a movable object including a power object, in accordance with an operation of the player, the power object may be caused to generate power, and the moving velocity of the movable object may be changed due to the generation of the power. For example, when the player character 100 is on a movable object at a stop, in accordance with an operation of the player, a power object may start an action, and in accordance with the power of the power object, the movable object may be caused to start moving. If the first NPC 110 is on a movable object, the mass of the first NPC 110 may or may not be taken into account.

Next, the processor 81 performs a first NPC control process (step S105). Here, the processor 81 shoots the first NPC 110 to the virtual space, moves the first NPC 110 in the virtual space in accordance with a predetermined algorithm, and causes the first NPC 110 to perform a predetermined action in the virtual space. The details of the first NPC control process in step S105 will be described below.

Next, the processor 81 performs an other character control process (step S106). Here, a process regarding the characters other than the player character 100 and the first NPC 110 and automatically controlled by the processor 81 is performed. Specifically, the processor 81 moves the enemy characters 200 in the virtual space in accordance with a predetermined algorithm, causes the enemy characters 200 to appear in the virtual space, and causes each enemy character 200 to perform an attack action on the player character 100. The processor 81 also moves the second NPC 111 in the virtual space in accordance with a predetermined algorithm and causes the second NPC 111 to perform a predetermined action in the virtual space. For example, if the player character 100 is not on a movable object, the processor 81 moves the second NPC 111 in the virtual space so that the second NPC 111 follows the player character 100. If the player character 100 is not on a movable object, the processor 81 also causes the second NPC 111 to perform a predetermined action. For example, the processor 81 controls the second NPC 111 to fight with an enemy character 200 as the predetermined action. Based on these types of control, the processor 81 moves the enemy characters 200 and the second NPC 111 by amounts of movement relating to a single frame and advances the animations of the enemy characters 200 and the second NPC 111 based on the actions by a single frame.

Next, the processor 81 performs a during-first-NPC-being-shot process (step S107). Here, a process when the first NPC 110 is shot to the virtual space and moving in the virtual space is performed. The details of the during-first-NPC-being-shot process in step S107 will be described below.

Next, the processor 81 performs an attack process on the player character 100 (step S108). Here, based on the operation data, the process of causing the player character 100 to perform an attack action and causing damage on an enemy character 200 is performed. Specifically, based on the operation data, the processor 81 determines whether or not an attack instruction is given. If an attack instruction is given, the processor 81 causes the player character 100 to start an attack action. The attack action is performed during a plurality of frames. During the attack action, in step S108, an animation regarding the attack action advances by a single frame. During the attack action, even if a new attack instruction is given, an attack action relating to the new attack instruction is not started. In step S108, the processor 81 also determines whether or not the attack action of the player character 100 that is being executed hits an enemy character 200. If the attack action hits an enemy character 200, the processor 81 causes damage on the enemy character 200. In step S108, when the player character 100 is attacked by an enemy character 200, the process of decreasing the life value of the player character 100 is performed.

Next, the processor 81 performs an output process (step S109). Specifically, the processor 81 generates an image of the virtual space relating to the results of the processes of the above steps S102 to S108 using the virtual camera and outputs the generated image to a display apparatus. The processor 81 also outputs a sound with the generation and the output of the image. Consequently, a game image is displayed on the display apparatus, and a sound relating to the game processing is output from a speaker.

Next, the processor 81 determines whether or not the game processing is to be ended (step S110). For example, if the player gives an instruction to end the game, the processor 81 determines that the game processing is to be ended (step S110: YES). Then, the processor 81 ends the game processing shown in FIG. 22. If the processor 81 determines that game processing is not to be ended (step S110: NO), the processor 81 executes the process of step S101 again. This is the description of the game processing shown in FIG. 22.

(Player Character Movement Control Process)

Figure 23:
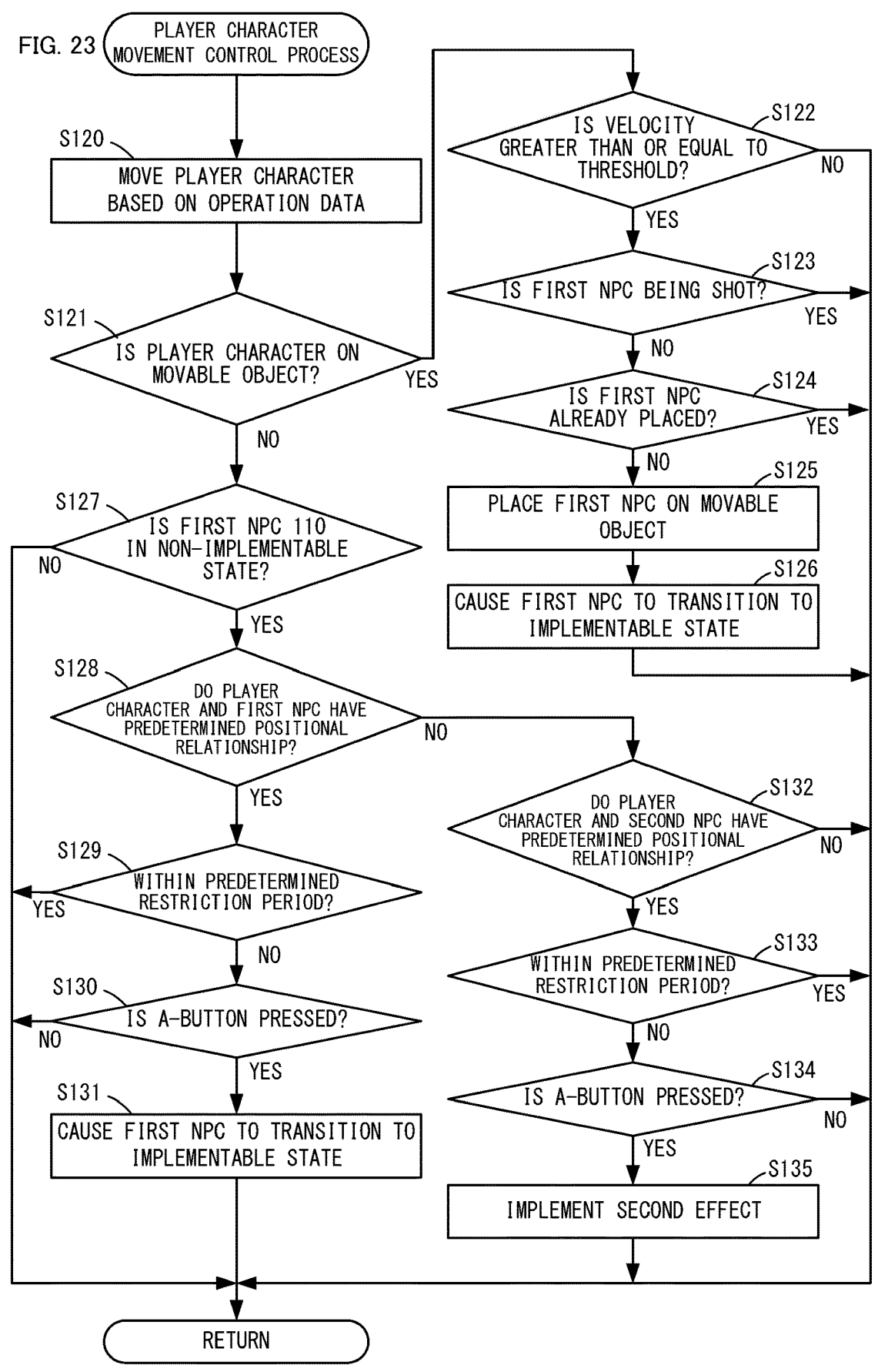
FIG. 23 is an example non-limiting flow chart showing an example of a player character movement control process in step S103.

Next, the details of the player character movement control process in the above step S103 are described. FIG. 23 is a flow chart showing an example of the player character movement control process in step S103.

First, the processor 81 moves the player character 100 in the virtual space based on the operation data (step S120). Here, for example, based on an operation input provided to the left analog stick 32, the processor 81 moves the player character 100 in the virtual space. Even if the player character 100 is on a movable object, the player character 100 moves on the movable object based on an operation input provided to the left analog stick 32. In a case where the player character 100 is not on a movable object, and if the first NPC 110 is in the implementable state, the processor 81 also moves the first NPC 110 in accordance with the movement of the player character 100. In a case where the player character 100 is not on a movable object and comes close to the movable object, and if a predetermined operation input is provided, the processor 81 causes the player character 100 to ride on the movable object.

Next, the processor 81 determines whether or not the player character 100 is on a movable object (step S121). Specifically, with reference to the player character data, the processor 81 determines whether or not the player character 100 is on a movable object.

If it is determined that the player character 100 is on a movable object (step S121: YES), the processor 81 determines whether or not the moving velocity of the movable object that the player character 100 is on is greater than or equal to a predetermined threshold (step S122). Here, based on the result of the above step S104, it is determined whether or not the moving velocity of the movable object that the player character 100 is on is greater than or equal to the threshold. In step S122, if the movable object that the player character 100 is on is moving only in the Y-axis direction (the up-down direction in the virtual space), and even if the velocity is greater than or equal to the predetermined threshold, the determination may be NO. That is, if the player character 100 on the movable object merely falls or rises, the determination may be NO in step S122. In this case, in step S122, it is determined whether or not the velocity in the X-axis direction or the Z-axis direction of the movable object that the player character 100 is on is greater than or equal to the threshold. Even if the player character 100 on the movable object merely falls or rises, but if the velocity of the movable object is greater than or equal to the threshold, the determination may be YES in step S122.

If the moving velocity of the movable object that the player character 100 is on is less than the threshold (step S122: NO), the processor 81 ends the process shown in FIG. 23.

If the moving velocity of the movable object that the player character 100 is on is greater than or equal to the threshold (step S122: YES), the processor 81 determines whether or not the first NPC 110 is being shot (step S123). Specifically, the processor 81 determines whether or not the first NPC 110 is the state where the first NPC 110 is shot to the virtual space in step S143 described below and is moving in the virtual space. For example, the processor 81 determines whether or not the current time is within a predetermined time after when the first NPC 110 is shot in step S143.

If it is determined that the first NPC 110 is being shot (step S123: YES), the processor 81 ends the process shown in FIG. 23.

If it is determined that the first NPC 110 is not being shot (step S123: NO), the processor 81 determines whether or not the first NPC 110 is already placed on the movable object that the player character 100 is on (step S124). If the first NPC 110 is already placed (step S124: YES), the processor 81 ends the process shown in FIG. 23.

If the first NPC 110 is not placed on the movable object that the player character 100 is on (step S124: NO), the first NPC 110 is placed on the movable object that the player character 100 is on (step S125). For example, the processor 81 places the first NPC 110 at a position set in advance on the movable object that the player character 100 is on. Alternatively, the placement position of the first NPC 110 may be determined based on the moving direction of the movable object and the position of the player character 100 on the movable object. For example, as the movable object, there may be a first movable object on which the placement position of the first NPC 110 is set in advance, and a second movable object on which the placement position of the first NPC 110 is not set in advance.

After step S125, the processor 81 causes the first NPC 110 to transition to the implementable state (step S126). Consequently, the first NPC 110 forms into a spherical shape. Specifically, the processor 81 saves, in the first NPC data, data indicating the first NPC 110 is in the implementable state and data indicating that the first NPC 110 is on the movable object. If the process of step S126 is performed, the processor 81 ends the process shown in FIG. 23.

If, on the other hand, it is determined that the player character 100 is not on a movable object (step S121: NO), the processor 81 determines whether or not the first NPC 110 is in the non-implementable state (step S127).

If the first NPC 110 is in the non-implementable state (step S127: YES), the processor 81 determines whether or not the player character 100 and the first NPC 110 have a predetermined positional relationship indicating that the player character 100 and the first NPC 110 are close to each other (step S128). Specifically, the processor 81 determines whether or not the distance between the player character 100 and the first NPC 110 is less than a predetermined threshold.

If it is determined that the player character 100 and the first NPC 110 have the predetermined positional relationship (step S128: YES), the processor 81 determines whether or not the current time is within a predetermined restriction period (step S129). For example, the predetermined restriction period may be the period from when the first NPC 110 is shot to the virtual space in the implementable state to when a certain time elapses. Alternatively, the predetermined restriction period may be the period from when the first NPC 110 returns to the periphery of the player character 100 after being shot to when a certain time elapses.

If the current time is not within the predetermined restriction period (step S129: NO), based on the operation data, the processor 81 determines whether or not the A-button is pressed (step S130).

If the A-button is pressed (step S130: YES), the processor 81 causes the first NPC 110 to transition to the implementable state (step S131). Specifically, the processor 81 stores in the first NPC data a value indicating that the first NPC 110 is in the implementable state. The processor 81 also places the first NPC 110 in the implementable state in front of the player character 100. Consequently, for example, the game image as shown in FIG. 7 is displayed.

If the determination is NO in step S127, or if the determination is YES in step S129, or if the determination is NO in step S130, or if the process of step S131 is executed, the processor 81 ends the process shown in FIG. 23.

If, on the other hand, it is determined that the player character 100 and the first NPC 110 do not have the predetermined positional relationship (step S128: NO), the processor 81 determines whether or not the player character 100 and the second NPC 111 have a predetermined positional relationship indicating that the player character 100 and the second NPC 111 are close to each other (step S132). For example, the processor 81 determines whether or not the distance between the player character 100 and the second NPC 111 is less than a predetermined threshold.

If it is determined that the player character 100 and the second NPC 111 have the predetermined positional relationship (step S132: YES), the processor 81 determines whether or not the current time is within a predetermined restriction period (step S133). The predetermined restriction period in step S133 may be set based on the implementation of the second effect associated with the second NPC 111, and the predetermined restriction period may be the period from when the second effect is implemented to when a certain time elapses.

If the current time is not within the predetermined restriction period (step S133: NO), based on the operation data, the processor 81 determines whether or not the A-button is pressed (step S134).

If the A-button is pressed (step S134: YES), the processor 81 implements the second effect associated with the second NPC 111 (step S135). The second effect is an effect different from the above first effect. For example, the second effect may be the effect of making a special attack in a case where the player character 100 makes a predetermined attack, or may be the expansion of a predetermined area.

If the determination is NO in step S132, or if the determination is YES in step S133, or if the determination is NO in step S134, or if the process of step S135 is executed, the processor 81 ends the process shown in FIG. 23.

(First NPC Control Process)

Next, the details of the first NPC control process in the above step S105 are described. FIG. 24 is a flow chart showing an example of the first NPC control process in step S105.

The processor 81 determines whether or not the first NPC 110 is in the implementable state (step S140).

If it is determined that the first NPC 110 is in the implementable state (step S140: YES), the processor 81 sets the shooting direction of the first NPC 110 (step S141). The process of step S141 is performed, thereby setting the shooting direction of the first NPC 110 and displaying the direction image 120 on the screen in accordance with the shooting direction. Specifically, as described with reference to FIG. 19, the processor 81 sets the rotation of the shooting direction of the first NPC 110 in the pitch direction in accordance with the tilt in the pitch direction in the virtual space of the surface on which the first NPC 110 is located. For example, if the first NPC 110 is located on the ground, the rotation in the pitch direction of the shooting direction of the first NPC 110 is set in accordance with the tilt of the ground. As described with reference to FIG. 20, the processor 81 sets a yaw direction component of the shooting direction of the first NPC 110 in accordance with the direction of the line of sight of the virtual camera VC.

Next, based on the operation data, the processor 81 determines whether or not a shooting instruction is given by the player (step S142). For example, the processor 81 determines whether or not the A-button is pressed.

If a shooting instruction is given (step S142: YES), the processor 81 shoots the first NPC 110 to the virtual space (step S143). Specifically, the processor 81 shoots the first NPC 110 at a predetermined velocity in the shooting direction set in step S141. The processor 81 also stores, in the first NPC data, data indicating that the first NPC 110 is being shot. Consequently, the first NPC 110 enters the state where the first NPC 110 is being shot. Then, the first NPC 110 starts moving in the virtual space.

After step S143, the processor 81 causes the first NPC 110 to transition to the non-implementable state (step S144).

If, on the other hand, it is determined that the first NPC 110 is not in the implementable state (step S140: NO), with reference to the first NPC data, the processor 81 determines whether or not the first NPC 110 is being shot (step S145).

If the first NPC 110 is being shot (step S145: YES), the processor 81 updates the position in the virtual space of the first NPC 110 and ends the process shown in FIG. 24.

If the first NPC 110 is not being shot (step S145: NO), the processor 81 automatically controls the first NPC 110 (step S146). The process of step S146 is performed when the player character 100 and the first NPC 110 are placed on a terrain (a ground, a water surface, a cliff surface, or the like) in the virtual space. Specifically, in accordance with a predetermined algorithm, the processor 81 moves the first NPC 110 in the virtual space or causes the first NPC 110 to perform a predetermined action in the virtual space. For example, the processor 81 moves the first NPC 110 in the virtual space so that the first NPC 110 follows the player character 100. The processor 81 also causes the first NPC 110 to perform a predetermined action. For example, the processor 81 controls the first NPC 110 to fight with an enemy character 200 as the predetermined action. Based on these types of control, the processor 81 moves the first NPC 110 by an amount of movement relating to a single frame and advances the animation of the first NPC 110 based on the predetermined action by a single frame.

If the determination is NO in step S142, or if the process of step S144, or if the determination is YES in step S145, or if the process of step S146, the processor 81 ends the process shown in FIG. 24.

(During-First-NPC-Shooting Process)

Figure 25:
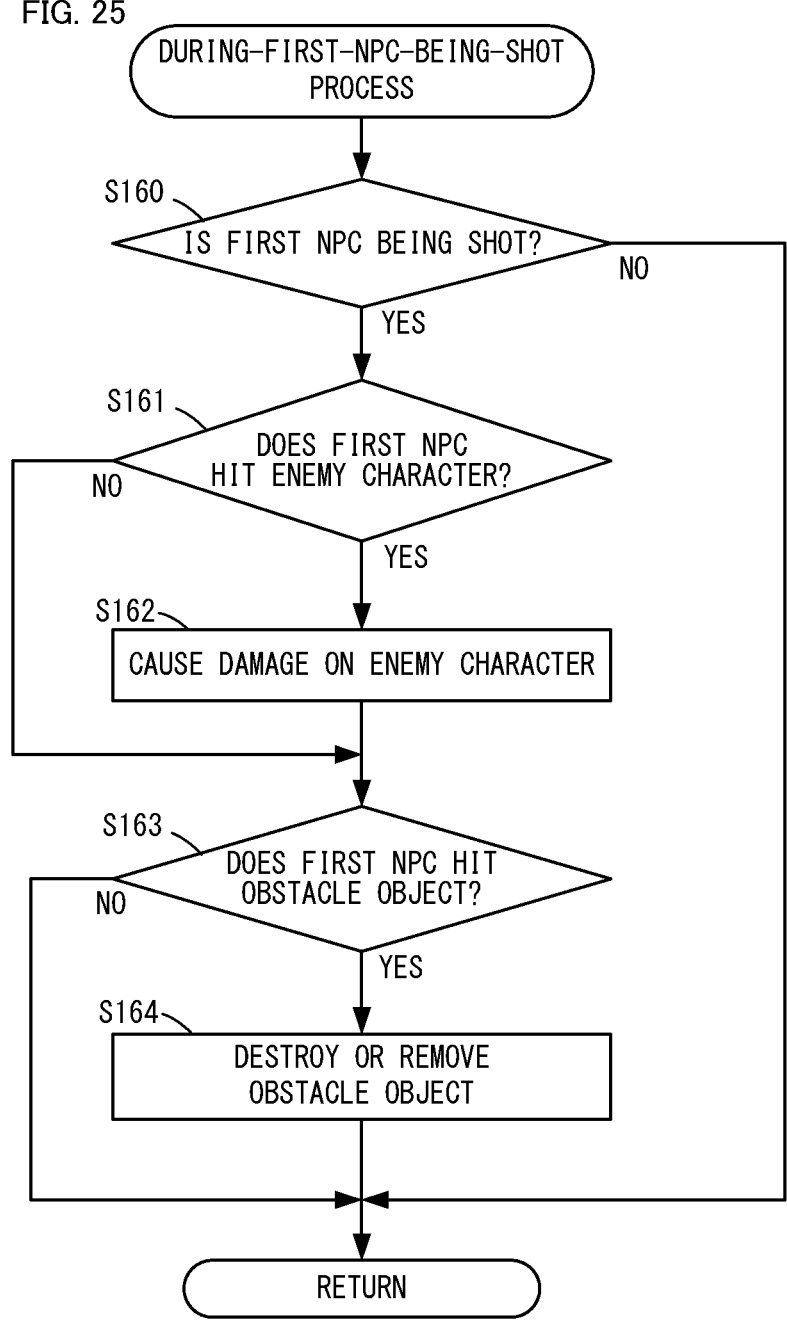
FIG. 25 is an example non-limiting flow chart showing an example of a during-first-NPC-being-shot process in step S107.

Next, the details of the during-first-NPC-being-shot process in the above step S107 are described. FIG. 25 is a flow chart showing an example of the during-first-NPC-being-shot process in step S107.

In step S160, with reference to the first NPC data, the processor 81 determines whether or not the first NPC 110 is in the state where the first NPC 110 is being shot. Here, it is determined whether or not the first NPC 110 is shot to the virtual space in the above step S143 and is in the state where the first NPC 110 is moving in the virtual space.

If the first NPC 110 is not being shot (step S160: NO), the processor 81 ends the process shown in FIG. 25.

If the first NPC 110 is being shot (step S160: YES), the processor 81 determines whether or not the shot first NPC 110 hits an enemy character 200 (step S161). Specifically, based on the position of the first NPC 110 and the position of an enemy character 200, the processor 81 determines whether or not the first NPC 110 hits an enemy character 200.

If the first NPC 110 hits an enemy character (step S161: YES), the processor 81 causes damage on the enemy character 200 (step S162). If the damage on the enemy character 200 exceeds a set threshold, the enemy character falls over.

If the determination is NO in step S161, or if the process of step S162 is performed, the processor 81 determines whether or not the first NPC 110 hits an obstacle object (step S163). Specifically, based on the position of the first NPC 110 and the position of an obstacle object, the processor 81 determines whether or not the first NPC 110 hits an obstacle object.

If the first NPC 110 hits an obstacle object (step S163: YES), the processor 81 destroys or removes the obstacle object (step S164).

If the determination is NO in step S163, or if the process of step S164 is performed, the processor 81 ends the process shown in FIG. 25.

The processes shown in the above flow charts are merely illustrative, and the order and the contents of the processes, and the like may be appropriately changed.

While the exemplary embodiment has been described above, the exemplary embodiment is merely an example and may be modified as follows, for example.

(Variations)

For example, in the above exemplary embodiment, if the player character 100 is on a movable object and the movable object is moving at a predetermined velocity or more, the first NPC 110 is placed by moving the first NPC 110 onto the movable object. The first NPC 110 does not necessarily need to be in contact with the surface of the movable object. For example, the first NPC 110 may be not only in contact with the upper surface of the movable object, but also in contact with the side surface or the bottom surface of the movable object. Such a case is also included in "the first NPC 110 is placed on the movable object".

In the above exemplary embodiment, if the player character 100 is on a movable object and the movable object is moving at a predetermined velocity or more, the first NPC 110 is placed on the movable object. For example, the predetermined velocity may be "0". That is, if the player character 100 is on a movable object, and even if the velocity of the movable object is zero, the first NPC 110 may be placed on the movable object.

In the above exemplary embodiment, if the player character 100 is on a movable object and the movable object is moving at a predetermined velocity or more, the state where the first NPC 110 is on the movable object is displayed, and the first NPC 110 is placed on the movable object. In another exemplary embodiment, if the player character 100 is on a movable object and the movable object is moving at a predetermined velocity or more, the first NPC 110 may be instantaneously placed on the movable object.

In the above exemplary embodiment, after the first NPC 110 is shot, the first NPC 110 enters the state where the first NPC 110 is being shot. Then, the state where the first NPC 110 returns onto a movable object is displayed, and the first NPC 110 is brought into the implementable state again. In another exemplary embodiment, after the first NPC 110 is shot, the first NPC 110 enters the state where the first NPC 110 is being shot only for a predetermined time. Then, the first NPC 110 may be instantaneously placed on a movable object and enter the implementable state.

In the above exemplary embodiment, if the player character 100 is not on a movable object, it is determined whether or not the player character 100 has a predetermined positional relationship with the first NPC 110 or the second NPC 111 (the above step S128 or S132). Even when the player character 100 is on a movable object, but if the first NPC 110 is in the non-implementable state, it may be determined whether or not the player character 100 has a predetermined positional relationship with the first NPC 110 or the second NPC 111, and if the player character 100 has the predetermined positional relationship, an effect related to the first NPC 110 or the second NPC 111 may be implemented in accordance with the pressing of the A-button. That is, even when the player character 100 is on a movable object, but if the first NPC 110 is not on the movable object, the player character 100 comes close to the first NPC 110 or the second NPC 111, and the first NPC 110 is caused to transition to the implementable state (step S131) or the second effect is implemented (step S135) based on the pressing of the A-button. Specifically, if the determination is NO in the above step S122, the process of step S127 may be executed.

In the above exemplary embodiment, if the first NPC 110 is in the implementable state, the first NPC 110 is shot to the virtual space as a first action. Alternatively, the first NPC 110 may be caused to perform any action as the first action. For example, the first NPC 110 may perform the action of making an attack on the spot, or the first NPC 110 may perform the action of flying an object. Yet alternatively, the first NPC 110 may perform the action of producing a predetermined effect (e.g., the effect of increasing the offensive strength or the defensive strength of the player character 100, the effect of decreasing the offensive strength or the defensive strength of an enemy character 200, the effect of slowing the motion of an enemy character 200, or the like) in the virtual space.

In the above exemplary embodiment, a game that progresses while the player controls the player character 100 to defeat the enemy characters 200 automatically controlled by the processor 81 is assumed. In another exemplary embodiment, for example, a game where players fight with each other while controlling player characters of the players may be performed. In this case, a configuration may be employed in which, when each player character is on a movable object and the movable object is moving, the above first NPC 110 is placed on the movable object and transitions to the implementable state, and the first NPC 110 performs a first action in accordance with the operation of each player.

The configuration of the hardware that performs the above game is merely an example, and the above game processing may be performed by any other hardware. For example, the above game processing may be executed by any information processing apparatus such as a personal computer, a tablet terminal, a smartphone, or a server on the Internet. The above game processing may also be executed by an information processing system including a plurality of apparatuses.

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein instructions that, when executed, cause a processor of an information processing apparatus to execute game processing comprising:

moving a player character in a virtual space based on a first operation input from a user;

automatically moving a first non-player character in the virtual space;

when the player character is on an object and the object is moving in the virtual space, placing the first non-player character on the object and causing the first non-player character to transition to an implementable state where the first non-player character can implement a first action; and when the first non-player character is in the implementable state, causing the first non-player character to perform the first action in accordance with a second operation input from the user.

2. The non-transitory computer-readable storage medium according to claim 1, wherein the game processing further comprises, in a case where the first non-player character is not in the implementable state, and when the player character and the first non-player character have a predetermined positional relationship, causing the first non-player character to transition to the implementable state in accordance with provision of a third operation input.

3. The non-transitory computer-readable storage medium according to claim 2, wherein the game processing further comprises shooting the first non-player character in a predetermined direction as the first action.

4. The non-transitory computer-readable storage medium according to claim 3, wherein the game processing further comprises setting the predetermined direction at least based on a direction of a line of sight of a virtual camera at a timing when the second operation input is provided.

5. The non-transitory computer-readable storage medium according to claim 3, wherein the game processing further comprises setting the predetermined direction at least based on a direction of the object at a timing when the second operation input is provided.

6. The non-transitory computer-readable storage medium according to claim 3, wherein the game processing further comprises, after the first non-player character is shot, and when the player character is on the object and the object is moving, moving the first non-player character onto the object, placing the first non-player character again, and causing the first non-player character to transition to the implementable state.

7. The non-transitory computer-readable storage medium according to claim 6, wherein the game processing further comprises, when the first non-player character is shot, causing the first non-player character to transition from the implementable state to a non-implementable state where the first non-player character cannot implement the first action, and maintaining the first non-player character in the non-implementable state until a predetermined time elapses.

8. The non-transitory computer-readable storage medium according to claim 3, wherein the game processing further comprises, when the shot first non-player character hits an enemy character in the virtual space, causing damage on the enemy character, or when the shot first non-player character hits a predetermined obstacle object in the virtual space, destroying or removing the obstacle object.

9. The non-transitory computer-readable storage medium according to claim 2, wherein the game processing further comprises:

automatically moving a second non-player character in the virtual space; and when the player character and the second non-player character have a predetermined positional relationship, producing a second effect in accordance with the second operation input.

10. An information processing system comprising:

a processor; and a storage medium storing executable instructions that, when executed, cause the processor to execute game processing comprising:

moving a player character in a virtual space based on a first operation input from a user;

automatically moving a first non-player character in the virtual space;

when the player character is on an object and the object is moving in the virtual space, placing the first non-player character on the object and cause the first non-player character to transition to an implementable state where the first non-player character can implement a first action; and when the first non-player character is in the implementable state, causing the first non-player character to perform the first action in accordance with a second operation input from the user.

11. The information processing system according to claim 10, wherein the game processing further comprises, in a case where the first non-player character is not in the implementable state, and when the player character and the first non-player character have a predetermined positional relationship, causing the first non-player character to transition to the implementable state in accordance with provision of a third operation input.

12. The information processing system according to claim 11, wherein the game processing further comprises shooting the first non-player character in a predetermined direction as the first action.

13. The information processing system according to claim 12, wherein the game processing further comprises setting the predetermined direction at least based on a direction of a line of sight of a virtual camera at a timing when the second operation input is provided.

14. The information processing system according to claim 12, wherein the game processing further comprises setting the predetermined direction at least based on a direction of the object at a timing when the second operation input is provided.

15. The information processing system according to claim 12, wherein the game processing further comprises, after the first non-player character is shot, and when the player character is on the object and the object is moving, moving the first non-player character onto the object, placing the first non-player character again, and causing the first non-player character to transition to the implementable state.

16. The information processing system according to claim 15, wherein the game processing further comprises, when the first non-player character is shot, causing the first non-player character to transition from the implementable state to a non-implementable state where the first non-player character cannot implement the first action, and maintaining the first non-player character in the non-implementable state until a predetermined time elapses.

17. The information processing system according to claim 12, wherein the game processing further comprises, when the shot first non-player character hits an enemy character in the virtual space, causing damage on the enemy character, or when the shot first non-player character hits a predetermined obstacle object in the virtual space, destroying or removing the obstacle object.

18. The information processing system according to claim 11, wherein the game processing further comprises:

automatically moving a second non-player character in the virtual space; and when the player character and the second non-player character have a predetermined positional relationship, producing a second effect in accordance with the second operation input.

19. An information processing apparatus comprising:

a processor; and a storage medium storing executable instructions that, when executed, cause the processor to execute game processing comprising:

moving a player character in a virtual space based on a first operation input from a user;

automatically moving a first non-player character in the virtual space;

when the player character is on an object and the object is moving in the virtual space, placing the first non-player character on the object and causing the first non-player character to transition to an implementable state where the first non-player character can implement a first action; and when the first non-player character is in the implementable state, causing the first non-player character to perform the first action in accordance with a second operation input from the user.

20. The information processing apparatus according to claim 19, wherein the game processing further comprises, in a case where the first non-player character is not in the implementable state, and when the player character and the first non-player character have a predetermined positional relationship, causing the first non-player character to transition to the implementable state in accordance with provision of a third operation input.

21. An information processing method performed by an information processing system, the information processing method comprising:

moving a player character in a virtual space based on a first operation input from a user;

automatically moving a first non-player character in the virtual space;

in response to the player character being on an object and the object is moving in the virtual space, placing the first non-player character on the object and causing the first non-player character to transition to an implementable state where the first non-player character can implement a first action; and in response to the first non-player character is in the implementable state, causing the first non-player character to perform the first action in accordance with a second operation input.

22. The information processing method according to claim 21, further comprising, in a case where the first non-player character is not in the implementable state, and when the player character and the first non-player character have a predetermined positional relationship, causing the first non-player character to transition to the implementable state in accordance with provision of a third operation input.

* * * * *